United States Patent
Roush

(10) Patent No.: US 9,296,433 B2
(45) Date of Patent: Mar. 29, 2016

(54) TRAILER SAIL

(71) Applicant: Mark Roush, Lafayette, IN (US)

(72) Inventor: Mark Roush, Lafayette, IN (US)

(73) Assignee: Vanguard National Trailer Corporation, Monon, IN (US)

( * ) Notice: Subject to any disclaimer, the term of this patent is extended or adjusted under 35 U.S.C. 154(b) by 3 days.

(21) Appl. No.: 14/155,163

(22) Filed: Jan. 14, 2014

(65) Prior Publication Data

US 2015/0197291 A1 Jul. 16, 2015

(51) Int. Cl.
*B62D 35/00* (2006.01)
*B62D 35/02* (2006.01)

(52) U.S. Cl.
CPC .............. *B62D 35/001* (2013.01); *B62D 35/02* (2013.01)

(58) Field of Classification Search
CPC .............................. B62D 35/001; B62D 35/02
USPC ........................ 296/180.1, 180.4, 181.3, 181.5
See application file for complete search history.

(56) References Cited

U.S. PATENT DOCUMENTS

| | | | |
|---|---|---|---|
| 3,743,343 A | 7/1973 | Grote | 280/851 |
| 4,386,801 A | 6/1983 | Chapman | 280/107 |
| 4,486,046 A | 12/1984 | Whitney | 296/180.4 |
| 4,601,508 A | 7/1986 | Kerian | 296/180.4 |
| 4,640,541 A | 2/1987 | Fitzgerald | 296/180.1 |
| 5,211,718 A | 5/1993 | Gotz | 296/180.1 |
| 5,219,201 A | 6/1993 | Gotz | 296/180.1 |
| 5,322,340 A | 6/1994 | Sato | 296/180.1 |
| 7,828,368 B2 * | 11/2010 | Ortega et al. | 296/181.5 |
| 8,276,972 B2 * | 10/2012 | Domo et al. | 296/180.1 |
| 2004/0256884 A1 | 12/2004 | Schwartz | 296/180.4 |
| 2005/0040669 A1 | 2/2005 | Wood | 296/180.1 |
| 2005/0121945 A1 | 6/2005 | Browne | 296/180.1 |
| 2005/0146161 A1 | 7/2005 | Uland | 296/180.1 |
| 2005/0161976 A1 | 7/2005 | Ortega | 296/180.4 |
| 2008/0036173 A1 | 2/2008 | Alguera | 280/407 |
| 2008/0093887 A1 | 4/2008 | Wood | 296/180.4 |
| 2008/0129630 A1 | 6/2008 | Baliarda | 343/793 |
| 2008/0303309 A1 | 12/2008 | Dayton | 296/180.1 |
| 2008/0303311 A1 | 12/2008 | Roush | 296/180.4 |
| 2009/0146453 A1 | 6/2009 | Ortega | 296/180.4 |
| 2010/0117396 A1 | 5/2010 | Dayton | 296/180.1 |
| 2010/0231000 A1 | 9/2010 | Andrus | 296/180.4 |
| 2011/0204677 A1 | 8/2011 | Wood | 296/180.1 |
| 2011/0233960 A1 | 9/2011 | Heinz | 296/180.4 |
| 2013/0076066 A1 | 3/2013 | Wong | 296/180.4 |
| 2013/0181477 A1 | 7/2013 | Reiman | 296/180.4 |
| 2013/0249241 A1 | 9/2013 | Baker | 296/180.4 |
| 2013/0285411 A1 | 10/2013 | Layfield | 296/180.4 |

* cited by examiner

*Primary Examiner* — Joseph D Pape
*Assistant Examiner* — Dana Ivey
(74) *Attorney, Agent, or Firm* — Niro McAndrews, LLC

(57) ABSTRACT

A flexible trailer fairing for reducing aerodynamic drag on an over the road trailer is disclosed. A fourfold flexible fairing system may be used to reduce drag from both the trailer landing gear and wheel assembly. Numerous systems for keeping the flexible fairing taught while in continued use are also disclosed.

20 Claims, 32 Drawing Sheets

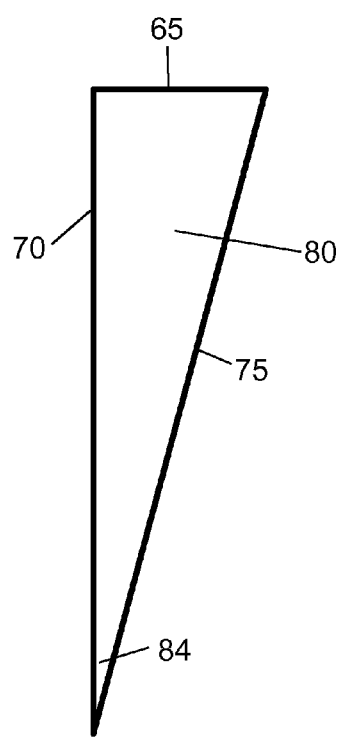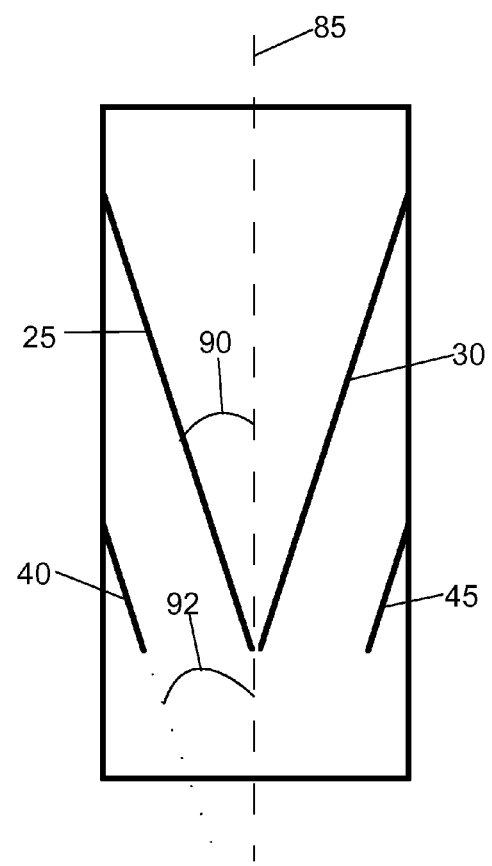

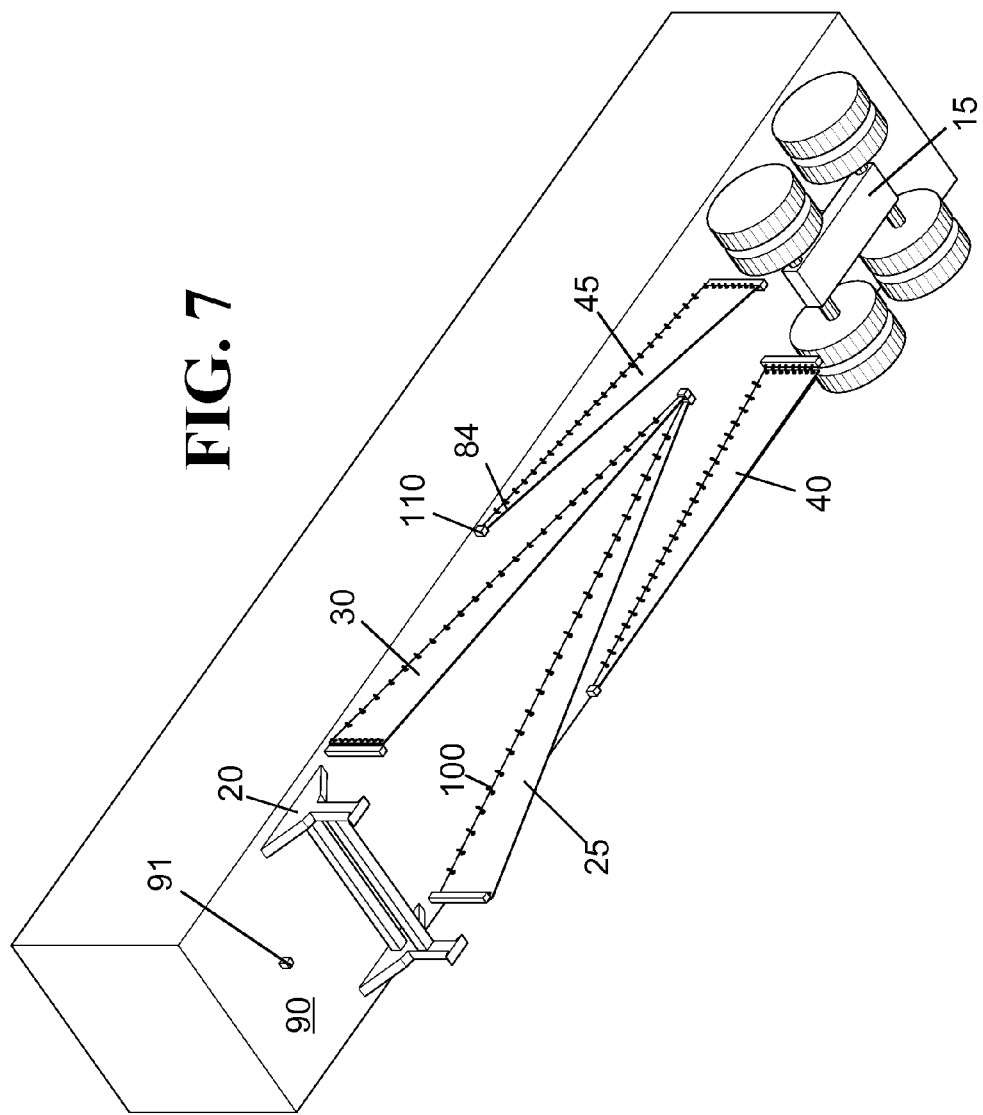

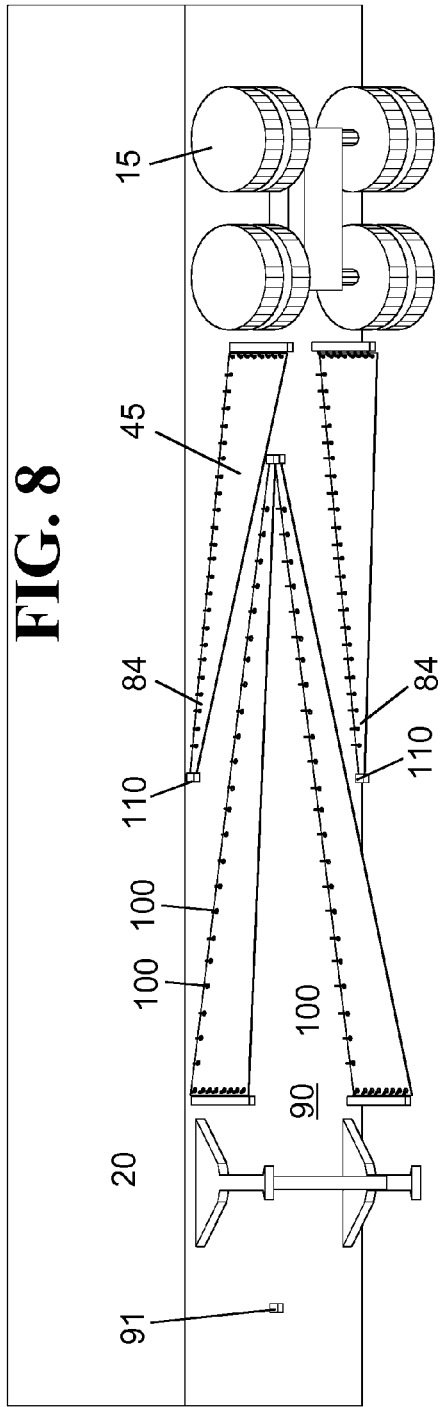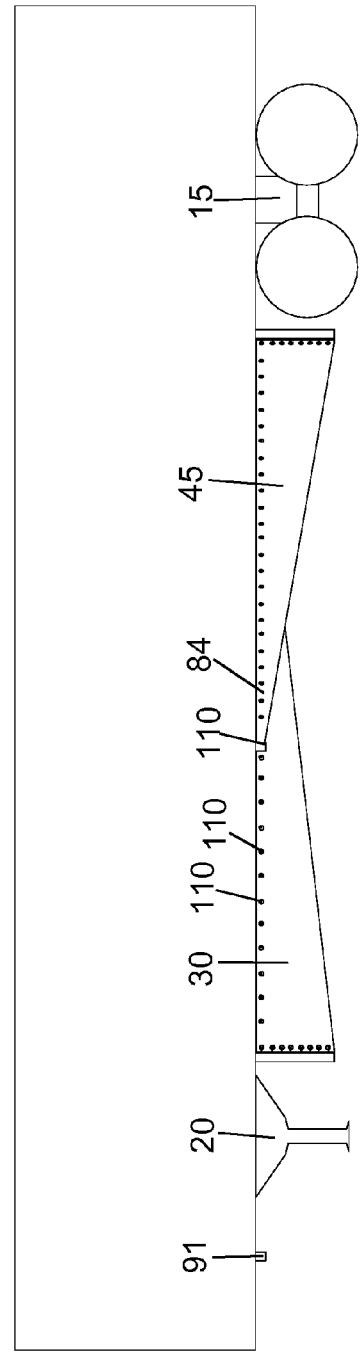

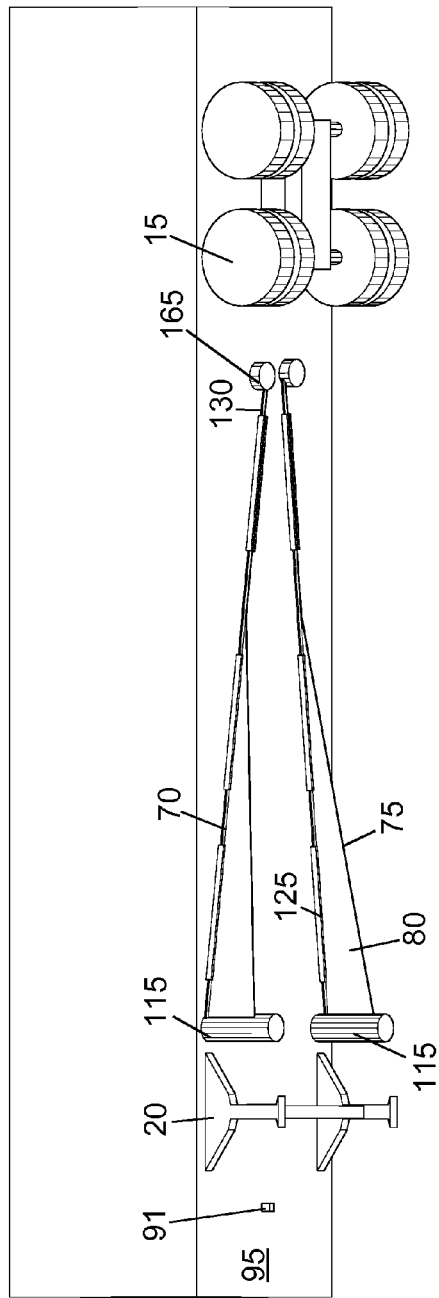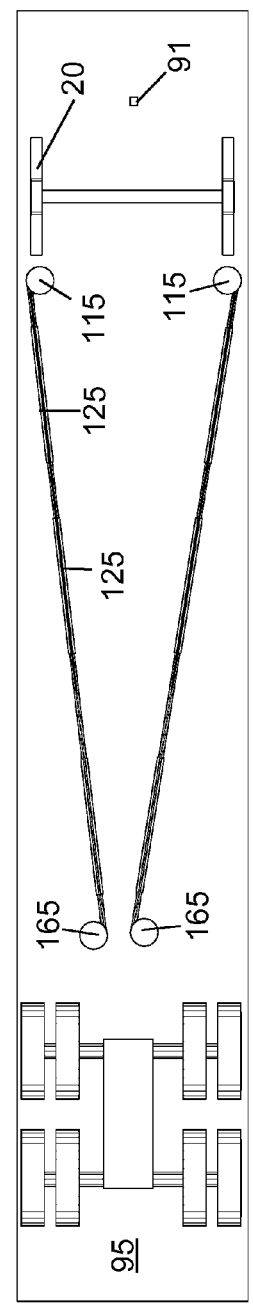

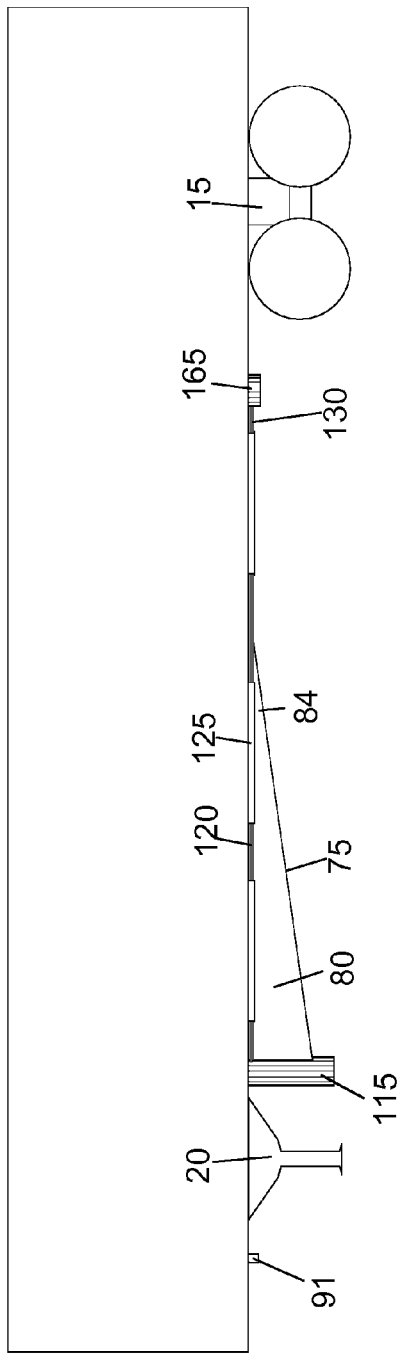

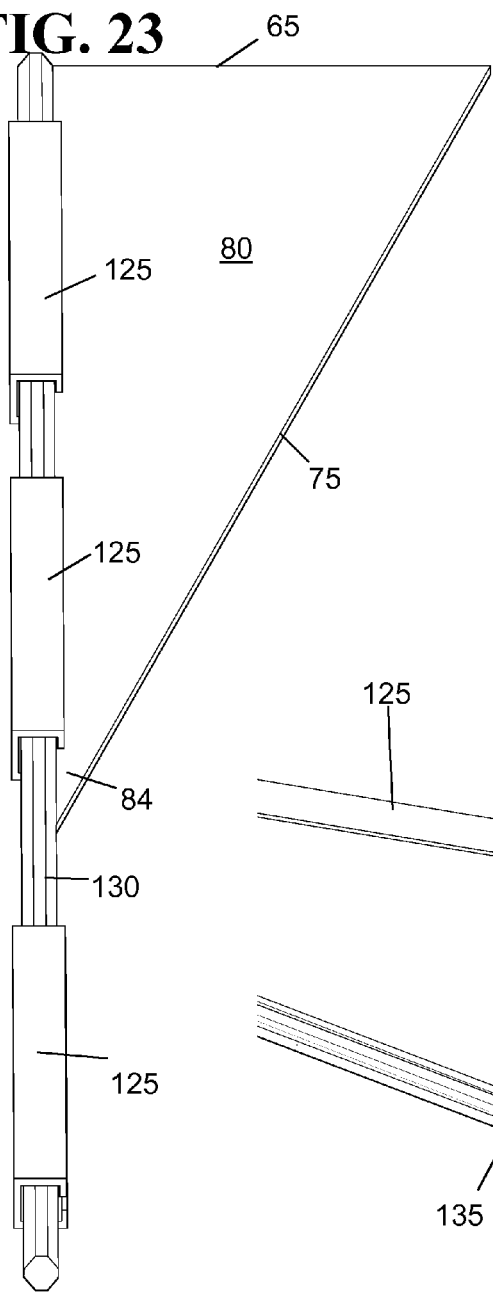
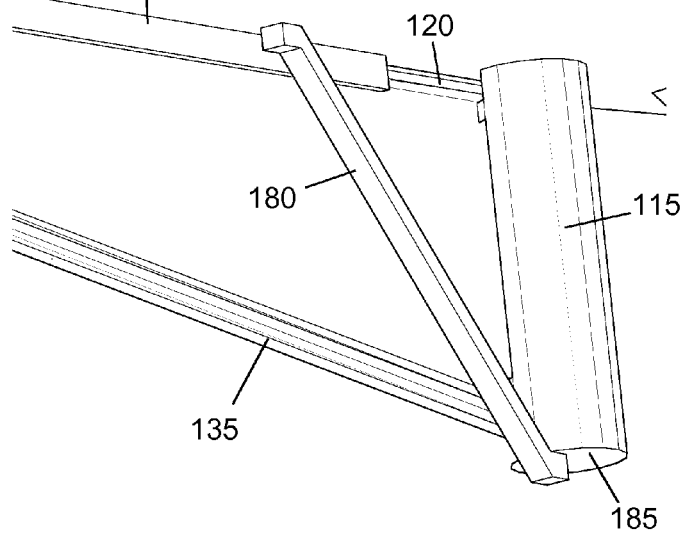

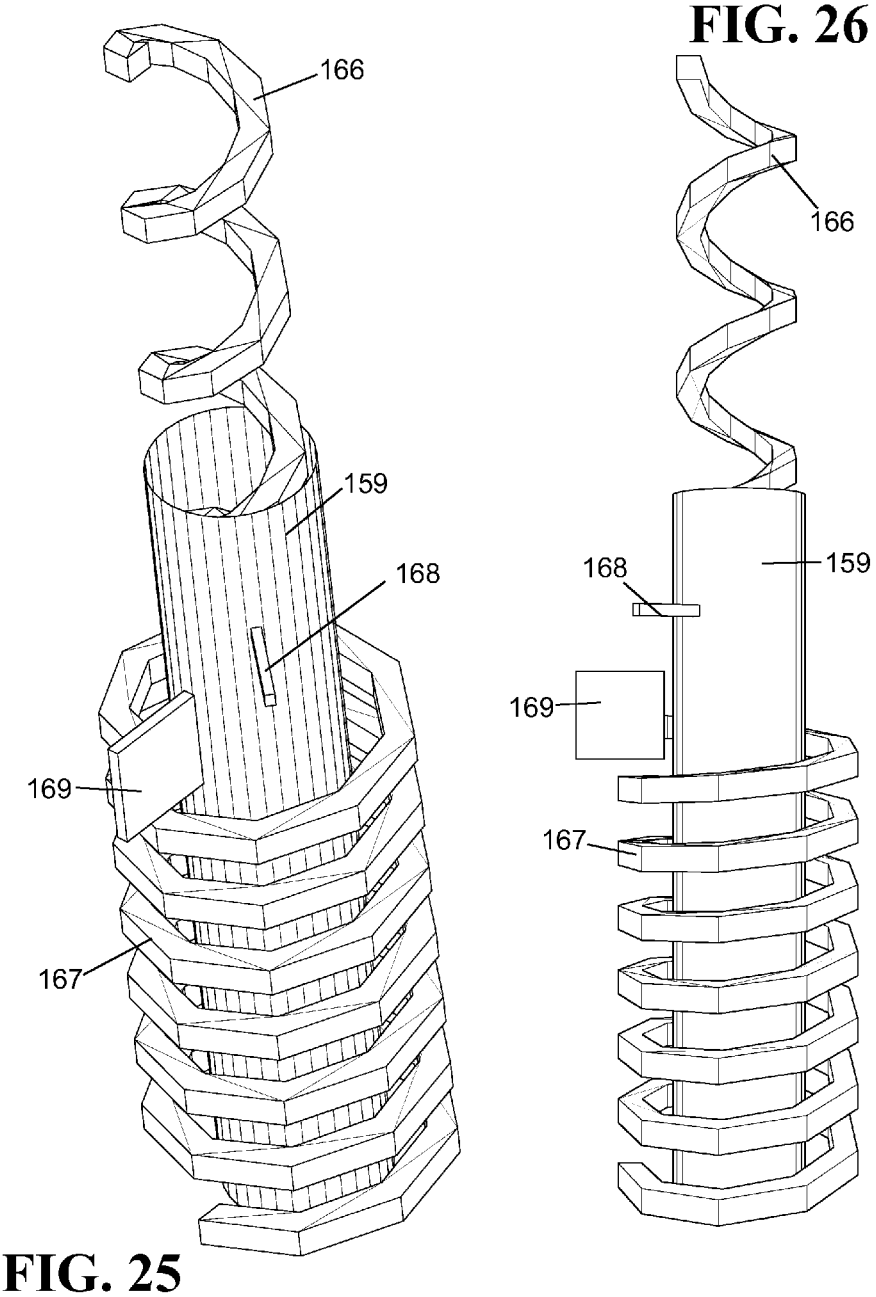

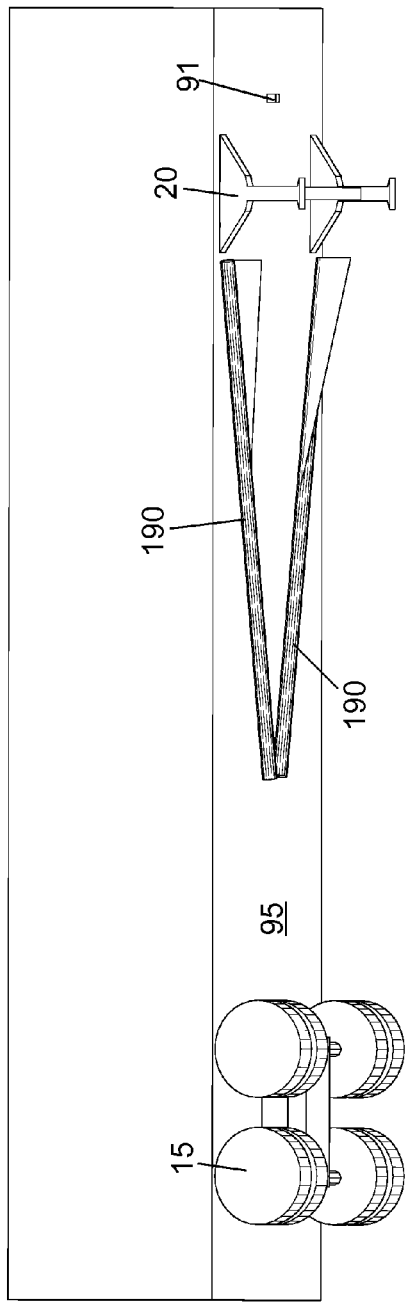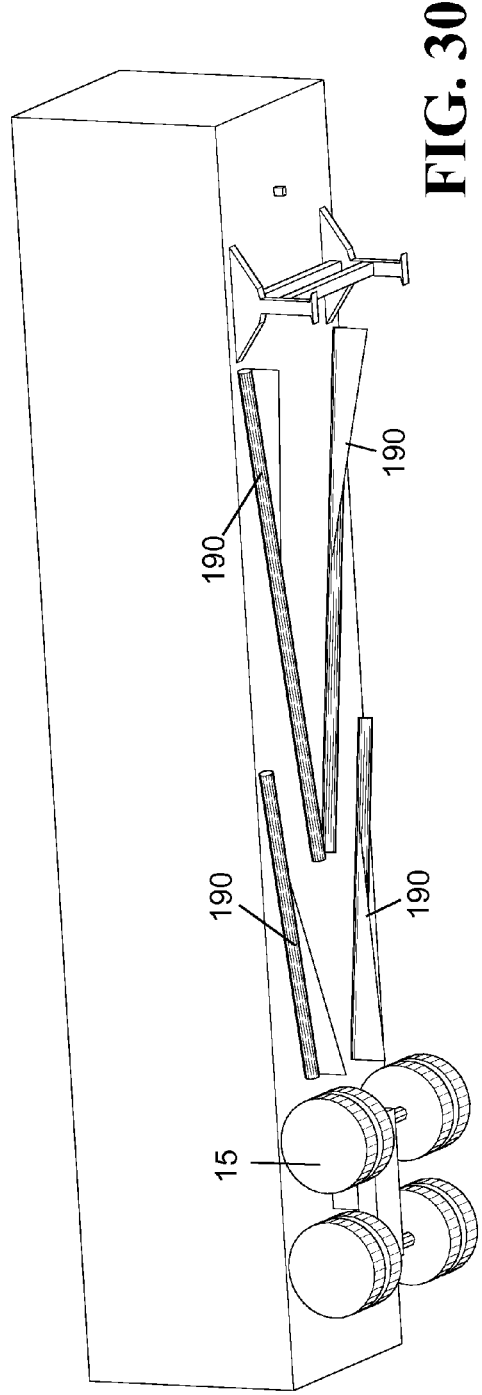

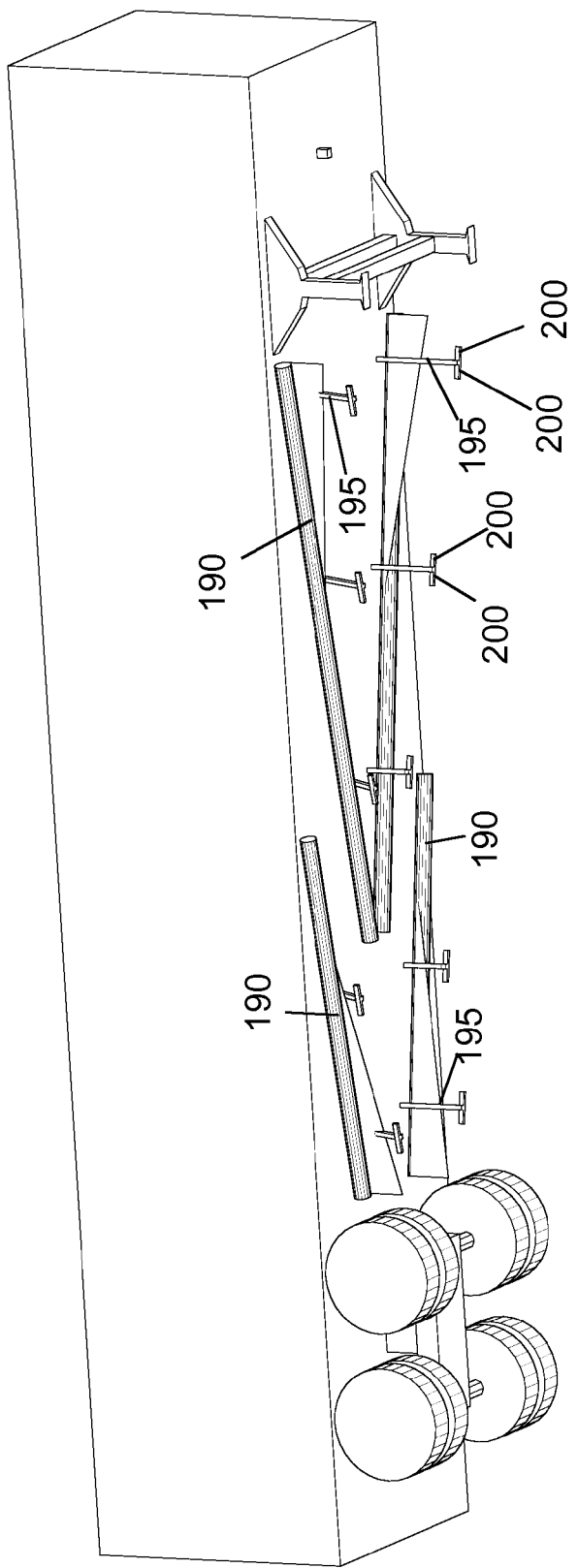

TRAILER SAIL

FIELD OF THE INVENTION

This invention relates to aerodynamic fairings for cargo containers. More specifically, it relates to aerodynamic fairings for the underside of a truck pulled trailer.

BACKGROUND OF THE INVENTION

Fairings are used to improve the aerodynamics of a vehicle and are typically added to the exterior of a vehicle to reduce drag while in motion. Fairings may be added at many locations on tractors and trailers to improve the aerodynamics of these large vehicles. In the past, fairings have been attached to the front and back of tractors as well as the front, top, bottom, and rear of the trailers. Fairings have also been placed in front of and behind the tires of a trailer to improve aerodynamics.

The wheel assemblies of trailers are also not aerodynamic and can increase the drag on the trailer when it is driven. Road debris can further collect on the underside of the trailer during transportation and result in increased aerodynamic drag. Thus it is desirable to have fairings that improve the aerodynamics of the trailer wheel assembly and the underside of the trailer.

A fairing adds weight to the trailer, which can increase the fuel consumption of the tractor. Thus, it is desirable to have a fairing that is as light as possible. There have been attempts to solve some of these issues. For example, U.S. Pat. No. 4,262,953 that issued to McErlane teaches "an airfoil or deflector panel for being mounted ahead of the rearmost set of wheels of a vehicle such as a truck or tractor-drawn trailer to direct air flow in a manner which reduces the relatively negative air pressure normally occurring behind a moving vehicle. The surface of the deflector which is presented in the direction of vehicle motion has a bilateral or compound convex curve."

U.S. Pat. No. 4,640,541 that issued to FitzGerald teaches "an air deflector for the rear wheels of vehicles such as trucks and trailers . . . . The deflector consists of a fairing suspended beneath the truck or trailer body immediately in front of the rear wheels and extending completely across the width of the body. The surface of the fairing is curved in both a lateral and a vertical direction to deflect impinging air and entrained water or snow around or under the wheels . . . . The device is formed with a plurality of generally vertical grooves angled toward the center line of the vehicle. The grooves direct impinging air downwardly and between the rear wheels."

U.S. Pat. No. 4,938,524 that issued to Straub teaches "a semi-truck trailer gooseneck assembly [that] comprises a single curved plate extending transversely between and beyond the twin parallel longitudinal girders to form a single lower flange. The curved plate extends from the assembly supporting the floor over the fifth wheel and connecting the king pin to the trailer. The rear portion of the curved plate extends to the horizontal flat lower flanges of the twin girders extending substantially the length of the trailer . . . . The rear corner post comprises a two piece welded assembly wherein the major section is substantially an elongated 'S' and the minor section 'L' shaped. The shapes are welded together to form a hollow center portion and a pocket portion. The 'L' section forms a contact for the rear door and the pocket engages the curtain to enable the curtain to be fully tightened when closed."

U.S. Pat. No. 6,837,536 that issued to Schwartz teaches "a belly pan, or membrane of rigid yet flexible material is of elongated shaped outline to be mounted along the bottom of tractor-trailer . . . . The belly pan is provided with a tapered front portion to be attached to the frontal portion of the trailer to the approximate location of the truck hitch. The belly pan extends rearward, under the trailer, between the rear wheels in a rectangular portion and the rearward edge is affixed to the ICC bumper of the trailer. An aerodynamic shaped deflector is attached to the frontal portion of the landing gear of the trailer and attaches to the belly pan for reducing drag between the underside of the trailer and the support beams of the landing gear. A similar aerodynamic shaped deflector is attached to the frontal portion of the ICC bumper and attached to the belly pan for reducing drag between the underside of the trailer and the beams of the ICC bumper."

U.S. Pat. No. 6,974,178 that issued to Ortega teaches "an apparatus for reducing the aerodynamic drag of a wheeled vehicle in a flow stream, the vehicle having a vehicle body and a wheel assembly supporting the vehicle body. The apparatus includes a baffle assembly adapted to be positioned upstream of the wheel assembly for deflecting airflow away from the wheel assembly so as to reduce the incident pressure on the wheel assembly."

U.S. Pat. No. 7,093,889 that issued to Graham teaches "a device for reducing vehicle aerodynamic resistance for vehicles having a generally rectangular body disposed above rear wheels, comprising a plurality of load bearing struts attached to the bottom of the rectangular body adjacent its sides, a plurality of opposing flat sheets attached to the load bearing struts, and angled flaps attached to the lower edge of the opposing sheets defining an obtuse angle with the opposing flat sheets extending inwardly with respect to the sides of the rectangular body to a predetermined height above the ground, which, stiffen the opposing flat sheets, bend to resist damage when struck by the ground, and guide airflow around the rear wheels of the vehicle to reduce its aerodynamic resistance when moving."

U.S. Patent Publication 20090146453 by Ortega teaches "a vehicle underbody fairing apparatus for reducing aerodynamic drag caused by a vehicle wheel assembly, by reducing the size of a recirculation zone formed under the vehicle body immediately downstream of the vehicle wheel assembly. The fairing body has a tapered aerodynamic surface that extends from a front end to a rear end of the fairing body with a substantially U-shaped cross-section that tapers in both height and width."

U.S. Patent Publication 20110233960 by Heinz teaches a "skirt fairing formed from a deformable skin material stretched tautly over a deflectable frame is provided that is attachable to the lower edge of a trailer. The installation of the skirt fairing deflects and alters the airflow beneath the trailer by creating smooth and cohesive airflow along the side and underneath the trailer of a tractor trailer rig in a manner that improves safety and decreases fuel consumption. Further, the fairing is formed using a deformable skin and deflectable frame that prevents damage or permanent displacement of the fairing should it impact an obstruction."

U.S. Patent Publication 20130076066 by Wong teaches "A system for managing airflow around the wheels of a vehicle, and in particular, around dual wheels of trailers typically pulled by Class 8 trucks . . . . In certain embodiments, a wedge-shaped airflow diverter is provided that reduces drag on the wheels of a trailer pulled by a truck, and thereby improves the overall efficiency of the truck-trailer combination with regard to aerodynamics and fuel efficiency."

SUMMARY OF THE INVENTION

In accordance with the preferred embodiments of the present invention, some of the issues associated with trailer fairings are overcome. An aerodynamic trailer fairing system is presented.

The fairing system includes a forward pair of symmetric fabric fairings that extend from approximately the trailer landing gear back towards the wheel bogie system of the trailer. The forward symmetrical fabric fairings each have a generally triangular wedge shape with a horizontal edge extending adjacent and roughly parallel to the underside of the trailer. Near the landing gear, the forward fairings have a height approximately equal to the retracted height of the landing gear while at their other ends they have tapered to a height of a few inches. The forward fairings are also inwardly angled so that as they run towards the rear of the trailer the separation of the two forward fairings decreases.

Along with the two forward fairings, two rear fairings direct air between the tires of the trailer. The rear fairings are also symmetrical with each other in that near the wheels of the trailer both fairings have a height that is commensurate with the height of the wheels while at a more middle point of the trailer both fairings have tapered down to a few inches. Additionally the two rear fairings are symmetrical in that near a middle portion of the trailer the two fairings are substantially separated from each other while they are in closer proximity near the wheels of the trailer.

BRIEF DESCRIPTION OF THE DRAWINGS

Preferred embodiments are described with reference to the following drawings, wherein:

FIG. 6a illustrates an isolated view of a flexible fairing.

FIG. 6b illustrates the symmetry of the fairing system.

FIG. 7 shows a lower perspective view of triangular flexible fairings secured to the bottom of a trailer with eyelets and hooks.

FIG. 8 shows a lower side perspective view of triangular flexible fairings secured to the bottom of a trailer with eyelets and hooks.

FIG. 9 shows a side view of triangular flexible fairings secured to the bottom of a trailer with eyelets and hooks.

FIG. 13 shows a lower side perspective view of a trailer with flexible fairings stretched by roller tensioners.

FIG. 14 shows a bottom view of a trailer with flexible fairings stretched by roller tensioners.

FIG. 15 shows a side perspective view of a trailer with flexible fairings stretched by roller tensioners.

FIG. 16 shows a lower perspective view of a trailer with four flexible fairings stretched by roller tensioners.

FIG. 23 shows a side view of a flexible fairing with a top wire secured in a plurality of C-clamps.

FIG. 24 shows a side perspective view of a roller tensioner having an angled side support extending from the bottom of the tensioner to the bottom of the trailer.

FIG. 25 shows a perspective view of a dual stage spring roller tensioner.

FIG. 26 shows a side view of a dual stage spring roller tensioner.

FIG. 29 shows a lower side perspective view of a trailer with two roll down flexible fairings.

FIG. 30 shows a lower side perspective view of a trailer with four roll down flexible fairings.

FIG. 31 shows a lower side perspective view of a trailer with four roll down flexible fairings and a plurality of rigid supports.

FIG. 40 also shows a tire with a rim having holes and vanes to direct air through the holes to between the tires.

DETAILED DESCRIPTION

General Arrangement of Fairings

Figure 1:
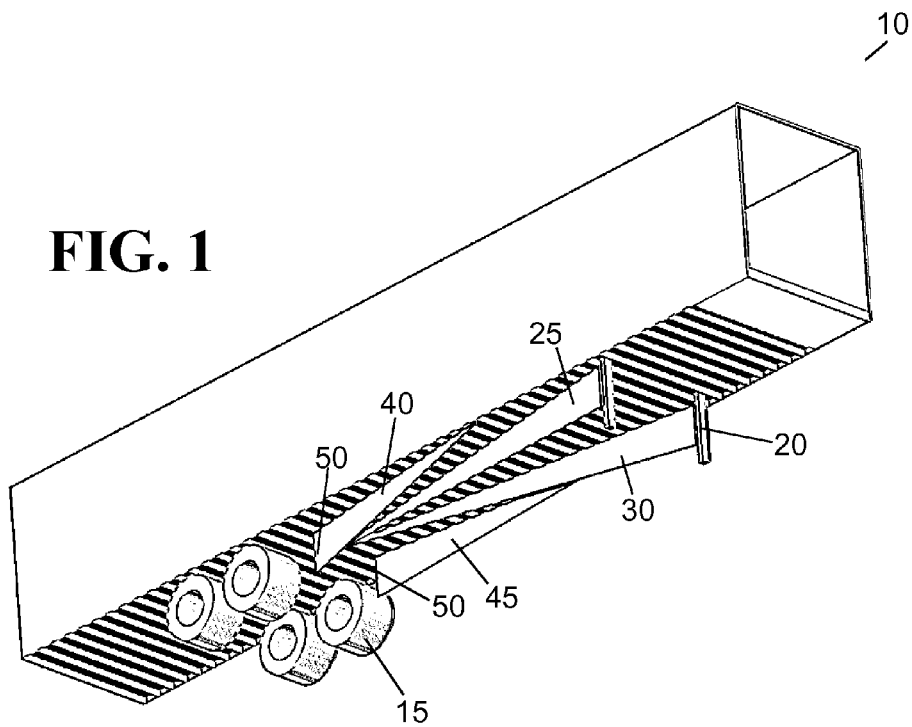
FIG. 1 shows a lower perspective view of a trailer equipped with four flexible triangular fairings.
Figure 2:
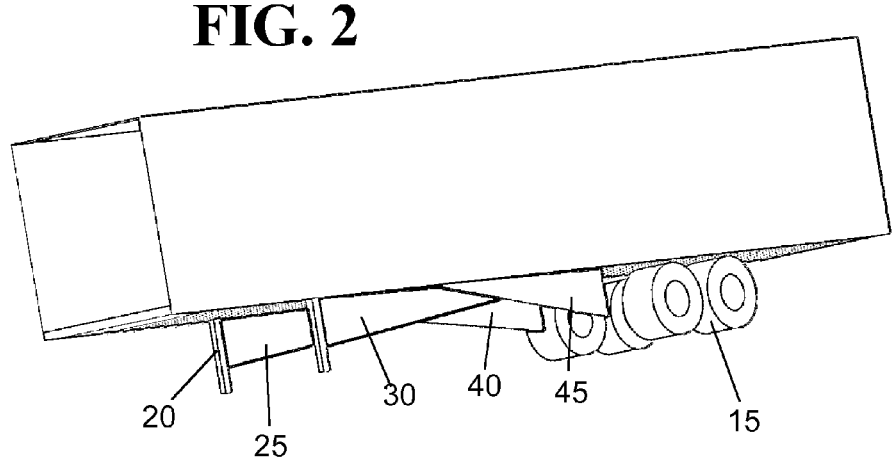
FIG. 2 shows a side perspective view of a trailer equipped with four triangular flexible fairings.
Figure 3:
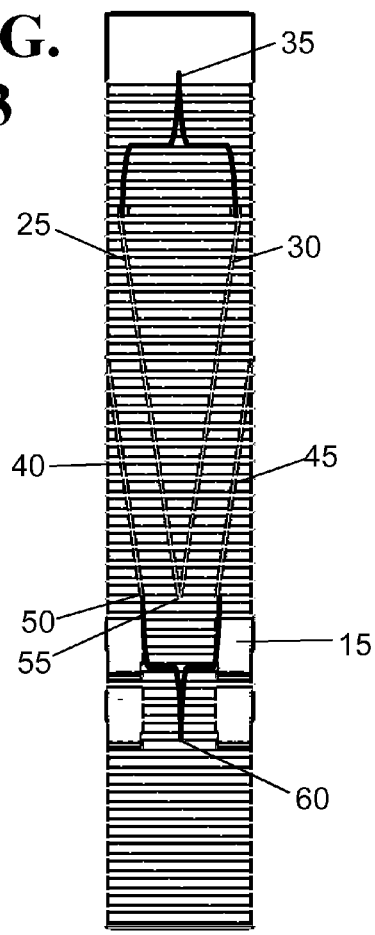
FIG. 3 shows a bottom view of a trailer equipped with four triangular flexible fairings.
Figure 4:
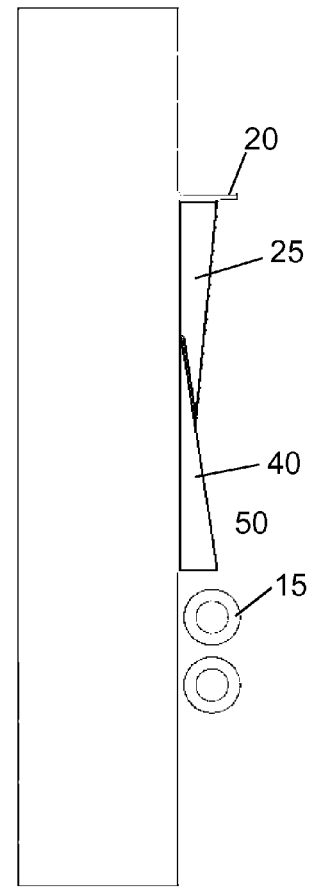
FIG. 4 shows a side view of a trailer equipped with four triangular flexible fairings.
Figure 5:
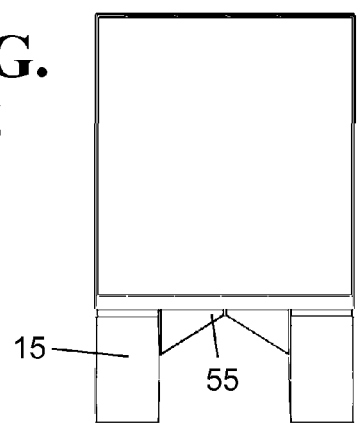
FIG. 5 shows a rear view of a trailer equipped with four triangular flexible fairings.

Referring now to the illustrations, FIG. 1 shows an over the road trailer 10 with a dual axle wheel bogie 15 and a set of landing gear 20 structured to support the trailer when the trailer is not being pulled by a tractor. Below the trailer are show four trailer fairings. The front right trailer fairing 25 and the front left trailer fairing 30 both approximately extend from the landing gear of the trailer and both of them have a first height near the landing gear. Near the landing gear, the front right fairing 25 and the front left fairing 30 are separated by a substantial distance 35. In the illustrated example, the distance is substantially the width of the trailer. As the front right trailer fairing 25 and the front left trailer fairing 30 extend towards the wheel bogie 15 of the trailer, they are angled toward each other and the center line (lengthwise axis 85) of the trailer. Additionally, as the two front trailer fairings extend towards the wheel bogie they both taper in regards to height such that at their terminus they have both tapered down to a height of a only few inches. While the heights of the front trailer fairings taper as they extend towards the rear of the trailer, the upper edge of the fairing stays at approximately the same separation from the lower surface of the trailer 90 such that the upper edge of the fairing is at substantially the same elevation from the landing gear to the back of the trailer.

Flanking the front trailer fairings are a left rear trailer fairing 45 and a right rear trailer fairing 40. In the illustrated example, the rear edges 50 of the rear trailer fairings are approximately aligned with the tapered ends 55 of the front trailer fairings, however in other embodiments the front fairings may extend back beyond the rear fairings, or alternatively there may be a gap between them where the front fairings end and the rear fairings begin. Similar to the front fairings, near the wheel bogie, the rear trailer fairings have a substantial height (approximately equal to the height of the wheels in the illustrated example), but as the rear trailer fairings extend towards a middle point of the trailer they taper in height down to a few inches in the illustrated example. The front trailer fairings along with the rear trailer fairings generally have a vertically aligned triangular shape with the shortest portions being located at a middle point between the landing gear and the wheel bogie of the trailer. As highlighted in FIG. 9, the triangular cross sections of the fairing system are advantageous in going over rough terrain (such as rail road crossings) as the high middle portion (below item 84 in FIG. 9) of the fairing decreases the likelihood that the fairing will scrape (and be damaged by) the ground underneath the trailer.

While the front trailer fairings and the rear trailer fairings are symmetrical in that they both vertically taper as they approach the middle point of the trailer (the lengthwise axis 85, see FIG. 6*b*), both the front and rear trailer fairings are widely separated at the more forward portions of the trailer and become closer as the fairings extend towards the rear of the trailer. In the illustrated example, the front trailer fairings inwardly extend to such a degree that at their rearmost portions the two front trailer fairings are almost contacting each other. In other embodiments, the two front trailer fairings may fully contact each other and the length of full contact may extend back to near the wheel bogie of the trailer.

While the front trailer fairings substantially approach each other in the illustrated examples, the rear trailer fairings still have a substantial separation 60 at their closest point near the wheel bogie. In one embodiment, the minimal separation of the rear trailer fairings from each other is substantially similar to the separation of the left and right wheels on the wheel bogie 15.

Figure 6:
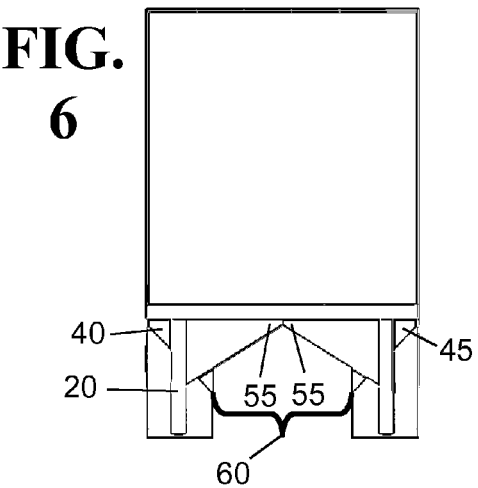
FIG. 6 shows a front view of a trailer equipped with four triangular flexible fairings.
Figure 10:
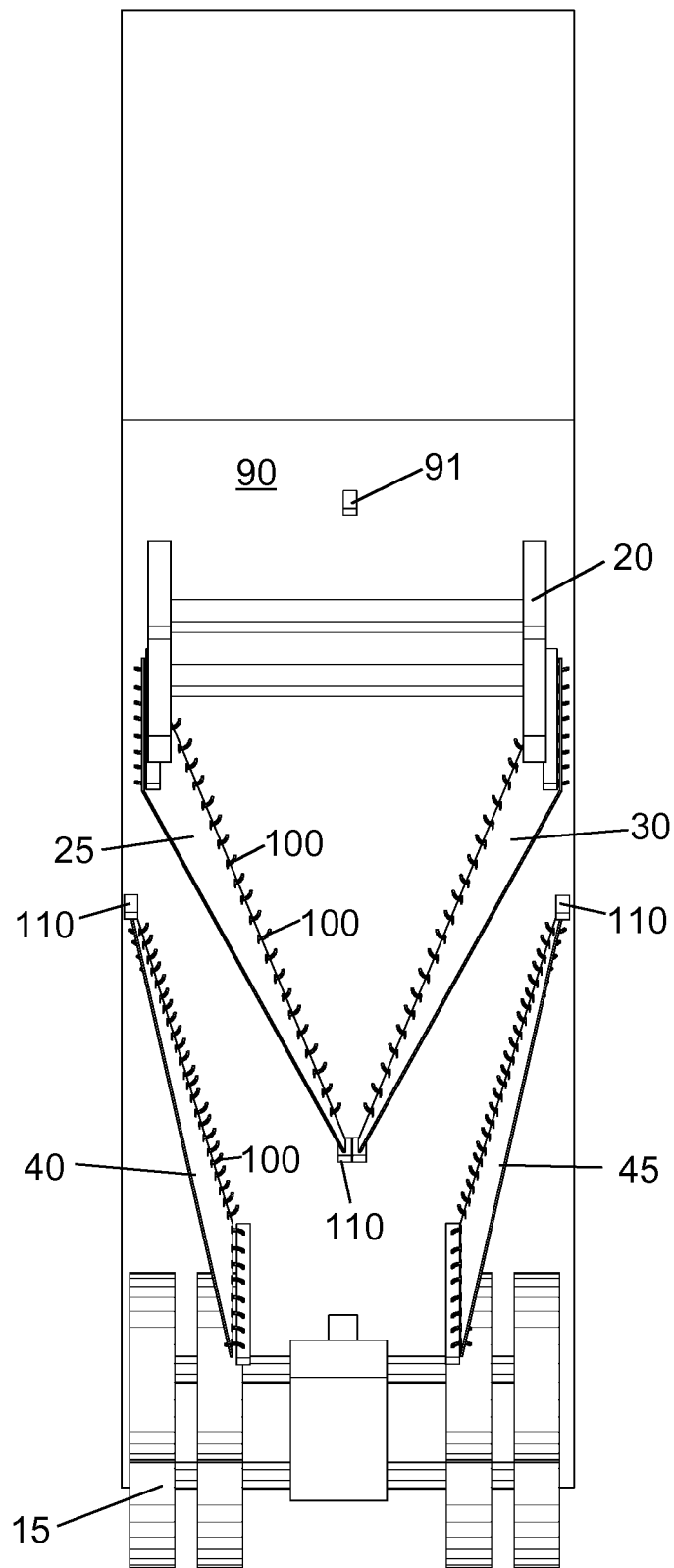
FIG. 10 shows a lower front perspective view of triangular flexible fairings secured to the bottom of a trailer with eyelets and hooks.
Figure 11:
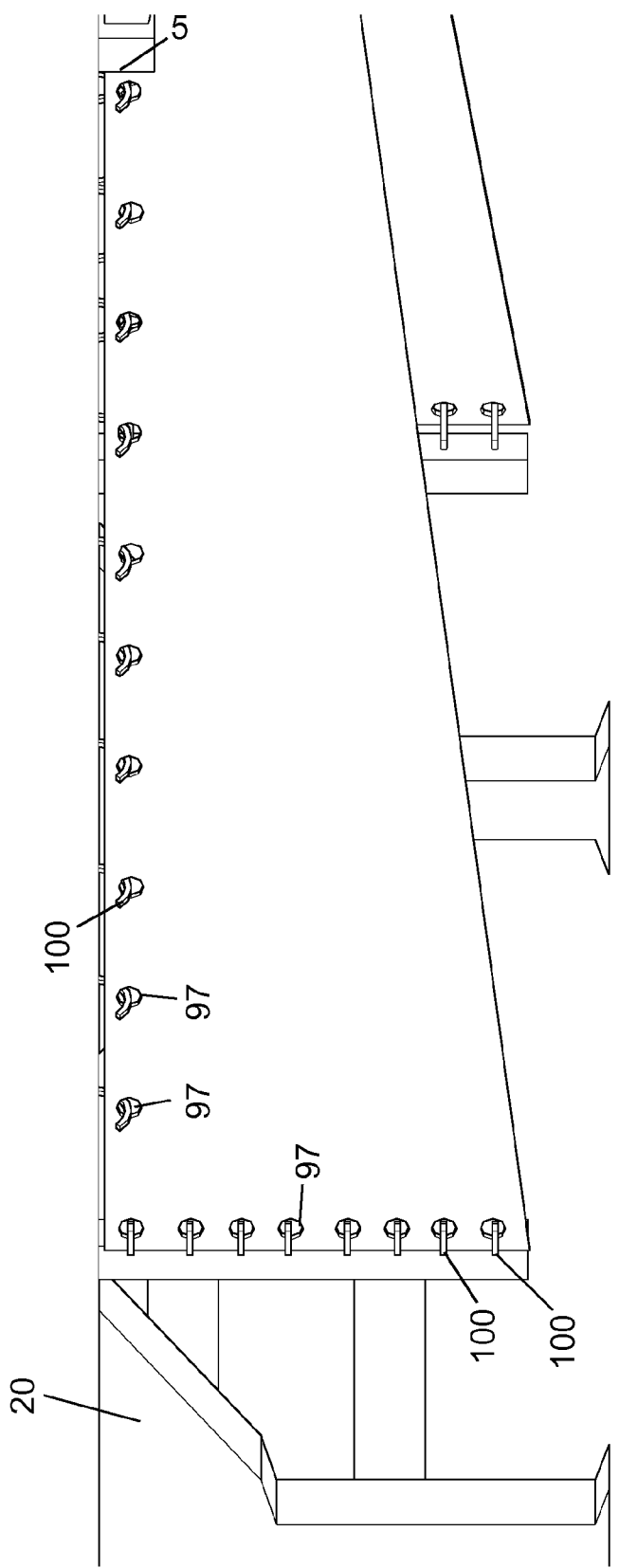
FIG. 11 shows a close up view of a triangular flexible fairing secured to the bottom of a trailer with hooks and eyelets.
Figure 12:
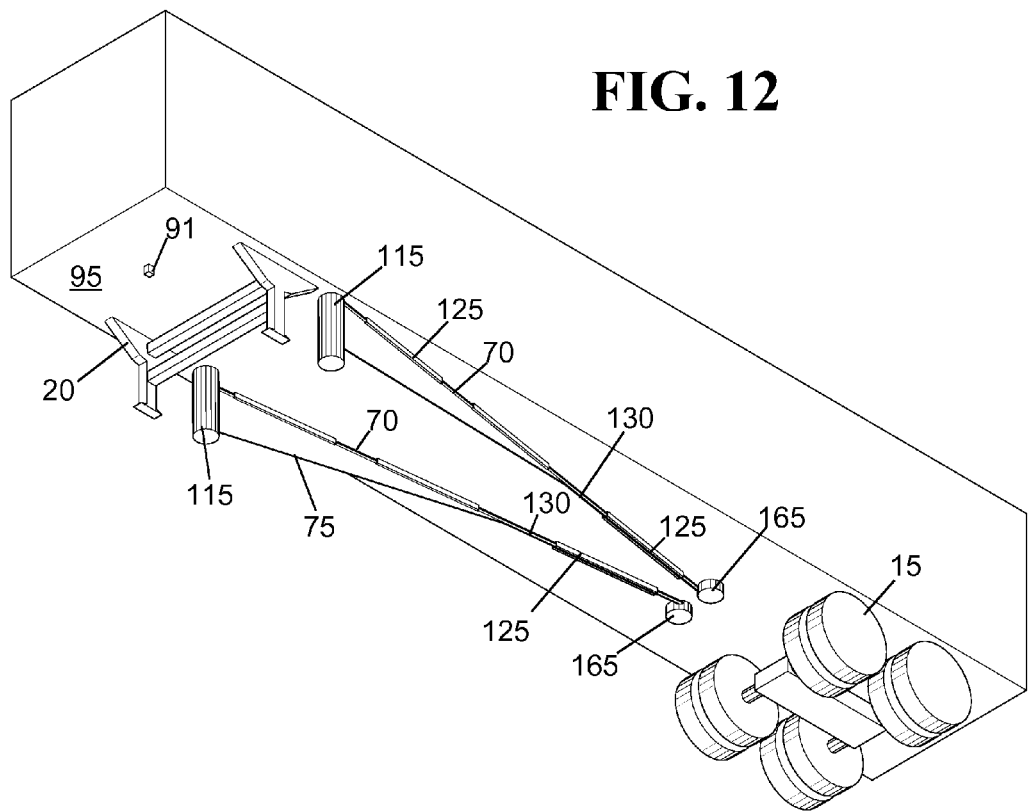
FIG. 12 shows a lower perspective view of a trailer with flexible fairings stretched by roller tensioners.
Figure 17:
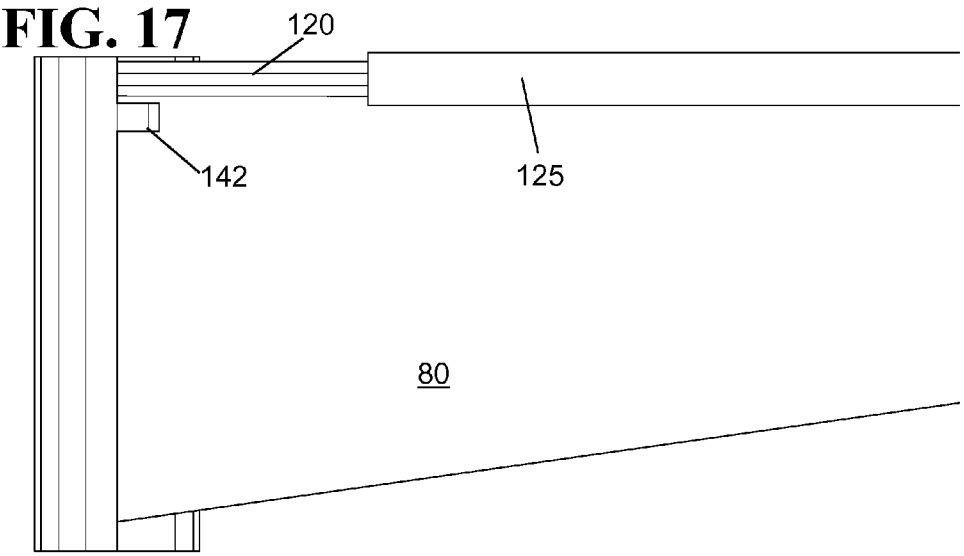
FIG. 17 shows a close up view of a roller tensioner with a slotted clamp for keeping the top of the flexible fairing at a predetermined level.

FIG. 6*a* shows an isolated view of a flexible fairing. The fairing includes a vertical edge 65 that extends from a horizontal edge 70 to an angled edge 75. The angled edge 75 tapers toward the horizontal edge 70 to form a generally triangular fairing surface 80 that acts to direct air flow underneath the trailer. In the illustrated example, the angled edge 75 is shown to be generally linear from the vertical edge 65 to the tapered end 84. However, it should be appreciated that the angled edge 75 may be concave, convex, parabolic, or another shape based upon the desired airflow. The fairing surface 80 is shown to be a generally uniform and continuous however a mesh or other weave may be used to direct airflow.

FIG. 6*b* shows the underside of a trailer with a lengthwise axis 85 about which the front right trailer fairing 25 and the front left trailer fairing 30 are symmetrical. The front right trailer fairing 25 extends from the lengthwise axis 85 at a first angle 90 and the right rear trailer fairing 40 extends away from the lengthwise axis 85 at a second angle 92. In the illustrated example, the first angle 90 and the second angle 92 are equal such that the top edge of the front right faring is parallel with the top edge of the right rear fairing, but it should be appreciated that the first angle 90 may be substantially greater, substantially less, or precisely equal to the second angle 92. In other examples, the second angle 92 may be variable based upon moving the rear ends of the rear trailer fairing. In the illustrated example, the front left fairing 30 also extends away from the lengthwise axis 85 at the first angle 90 and the left rear fairing extends away from the lengthwise axis 85 at the second angle 90.

Aerodynamics

The inwardly angling and upwardly tapering nature of the front trailer fairings acts to direct airflow between the wheels of the bogie to the rear of the trailer where the airflow acts to counter act the low pressure parasitic drag that occurs near the rear of the trailer that occurs at highway speeds. The rear trailer fairings further act to accelerate air between the wheels of the bogie to the lower pressure zone behind the trailer. The low pressure zone behind the trailer can be quite significant as studies have shown that a car traveling 10 feet behind an 18 wheel trailer can experience an astonishing 40% improvement in fuel efficiency. While closely tailgating a trailer on the highway is dangerous for numerous reasons, it helps to illustrate the potential fuel efficiency savings that may be realized if the low pressure region behind a box trailer is reduced.

Materials

The trailer fairings are preferably created from substantially inelastic materials such as Nylon, Dacron® (Polyethylene terephthalate), Pentex® (Polyethylene naphthalate), Kevlar® (Aramid), Technora, Spectra, Zylon® (Poly (p-phenylene-2, 6-benzobisoxazole)), or other canvas that is resistant to wear from road grime and debris. In one embodiment, the fairings are constructed of materials commonly used in boat sails. Due to the location of the fairings, a substantial amount of debris and dirt is expected to accumulate on the fairings, and in an exemplary embodiment the fairings have a coating (such as Teflon® (Polytetrafluoroethylene)) that helps to prevent degradation of the fairings. Other features, such as rip stop stitching, may also be incorporated into the fairings to help with their longevity in the brutal conditions to which they are exposed.

Basic Attachment System

Illustrated in FIGS. 7 through 11 are flexible fairings secured to the underside 95 of a trailer through a plurality of eyelets 97, grommets, ringlets, and fasteners 100. The flexible fairings are secured at various attachment points located on the underside 95 of the trailer also referred to as the frame of the trailer. The trailer includes a kingpin 91 located on the underside 90 of the trailer and the fairings are generally located between the kingpin 91 and the wheel bogie 15. While the eyelets 97 on the horizontal edge 70 are shown secured to fasteners 100 that are directly connected to the underside of the trailer, the eyelets on the vertical edge 65 are secured to fasteners 65 located on vertical supports 105 that extend down from underside 95 of the trailer. There tapered ends 84 of the fairings are secured to reinforced fasteners 110. In one example, the landing gear and the underside of the trailer have integrally formed protrusions, hooks, or fasteners that are configured to secure the trailer fairing. To install or remove the flexible fairing, a user simply secures the eyelets of the fairing to the corresponding fasteners that are formed on the trailer. In one variation, the trailer includes metal rods secured to the underside of the trailer and the fairings are secured to the rods with hooks in a manner similar to that of a shower curtain and rod.

Due to the low weight of the flexible fairings a single user is able to quickly and easily install the fairing without the use of specialized tools. In an exemplary embodiment, the fairings and trailer include specialized features or connection points that allow a tractor trailer operator to tension the flexible fairings using standard ratcheting tie downs that a commonly found used with box trailers to secure cargo within the trailer. In order to provide sufficient tension on the flexible fairings, it may be necessary or desirable for the fairing and trailer to include multiple attachment points that accommodate multiple ratcheting tie downs simultaneously. With the use of the tie downs, a tractor trailer operator is able to easily install the fairings without the use of any specialized tools or techniques.

Tensioning Systems

FIGS. 12 through 26 illustrate examples of trailer fairing systems where a roller rigging system is used to deploy and tension the trailer fairings. Two vertical rollers 115 are secured proximate to the trailer landing gear 20 and act to forwardly pull upon the front trailer fairings (25, 30). Although other features may be included, the vertical rollers will typically act in a manner similar to window roller blinds. Like roller blinds, the vertical rollers of the front trailer fairings in the illustrated example include a spring that is tensioned as the trailer fairing is pulled away from the roller. As with window roller blinds, even in the most retracted position of the front fairings, there still may be some forward pulling tension acting upon the fairing to ensure that the fairing is tightly stowed in the vertical roller.

As the flexible fairing is pulled out of the housing, a system is utilized to keep the whole of the upper horizontal edge 70 of the fairing in close proximity to the underside 90 of the trailer. In one example, the fairing includes an upper bulbous edge 120 that is configured to be secured within a C-shaped track 125 secured to the underside of the trailer. When the bulbous portion is located within the C-shaped track, the upper horizontal edge 70 of the fairing may be pulled towards the middle part of the trailer, but is kept within the track. The inventor contemplates numerous ways in which the bulbous region of the fairing may be formed. In one example, a thick metal cable 130 is integrally formed in the upper edge of the fairing and the C-shaped track has a lower opening with a width less than that of the thick metal cable. In another example, the bulbous portion may be formed by simply folding the end of the flexible fairing over several times and securing the folds together with stitching. In the illustrated example, the bulbous upper edge of the fairing extends unbroken from the vertical roller to the middle portion of the trailer. However it should be appreciated that intermittent bulbous edges may also be used to secure the upper edge of the fairing in the C-shaped track. In one example, the majority of the upper edge of the faring has a width comparable to that of the rest of the fairing, but at predetermined intervals a bulbous pocket is formed that acts to keep the edge of the fairing in the track. Marble shaped objects may be included within the bulbous pockets to help the pockets maintain their form.

Figure 18:
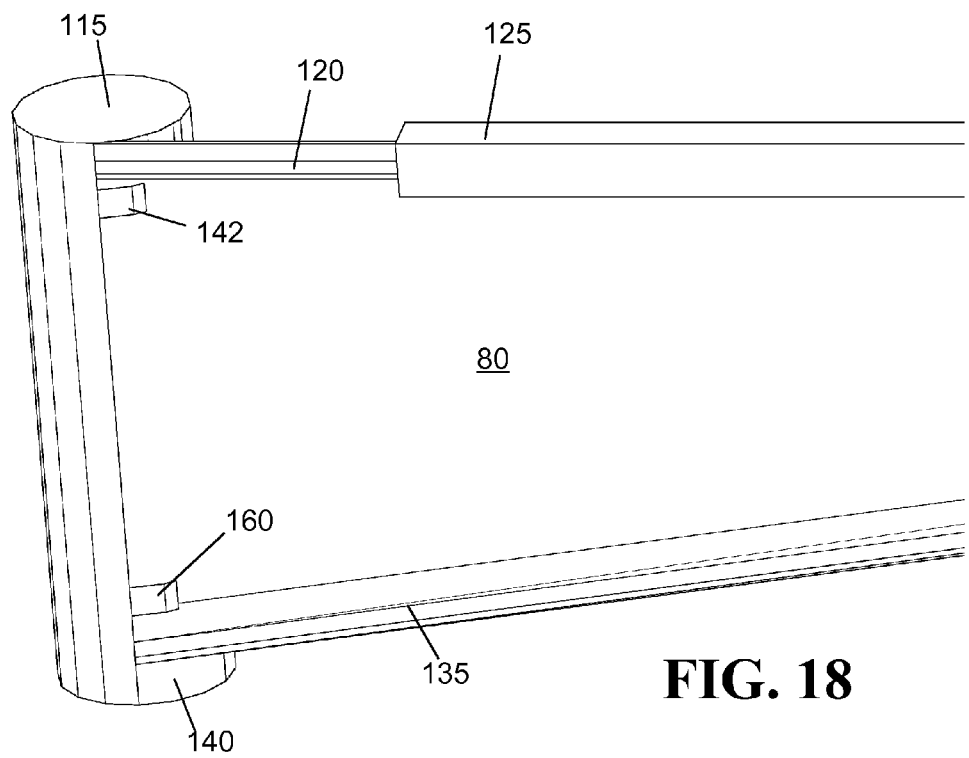
FIG. 18 shows a close up view of a roller tensioner with a stationary slotted clamp for keeping the top of the flexible fairing at a predetermined level and a movable slotted clamp for pulling the bottom of the flexible fairing away from the top.
Figure 19:
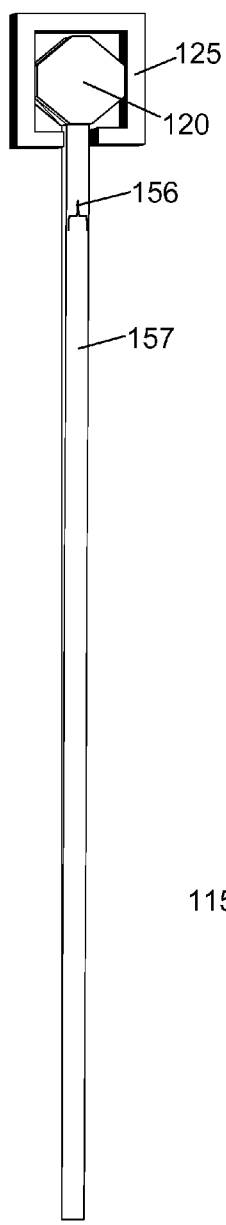
FIG. 19 shows a close up side view of a flexible fairing with a top wire secured in a C-clamp configured to be secured to the bottom of a trailer.
Figure 20:
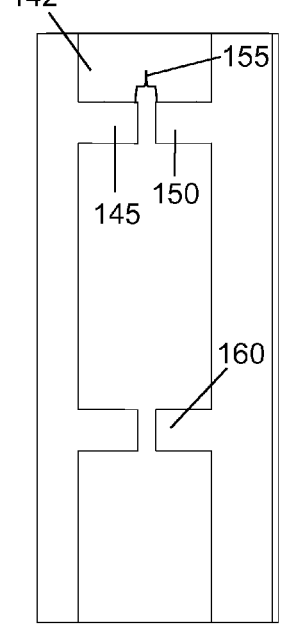
FIG. 20 shows a side view of a roller tensioner housing with a top and bottom clamp for adjusting the position of the top and bottom of a flexible fairing.
Figure 21:
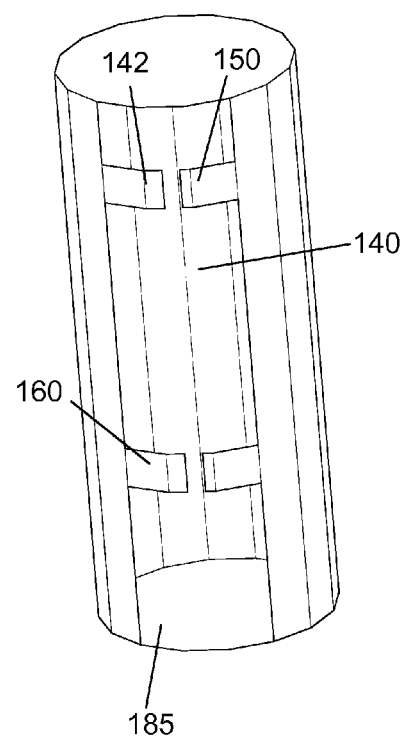
FIG. 21 shows a perspective view of a roller tensioner housing with a top and bottom clamp for adjusting the position of the top and bottom of a flexible fairing.
Figure 22:
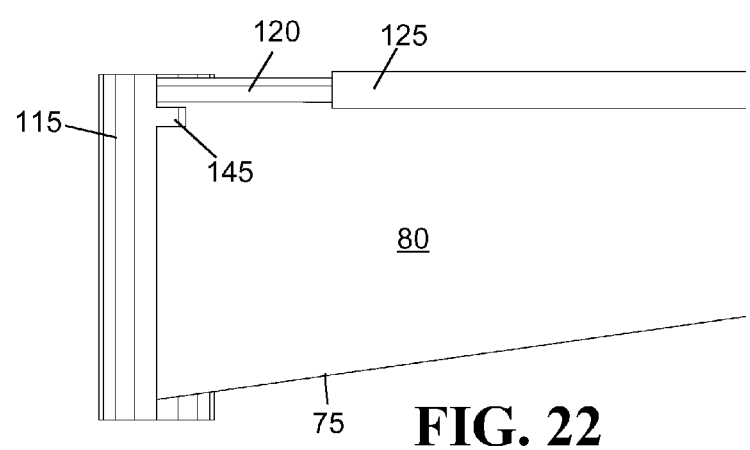
FIG. 22 shows a side view of a roller tensioner with a slotted clamp for keeping the top of the flexible fairing at a predetermined level.

The lower angled edge 75 of the fairing may also have a bulbous edge 135 (FIG. 18) secured in a C-shaped track, however in the illustrated example the lower edge of the fairing has a reinforced bulbous edge that is not secured within a track. As shown in detail in FIG. 18, the housing of the vertical roller includes a slat 140 through which the fairing is retracted. The slat 140 shown in FIG. 17 includes an upper clamp 145 that is separated from the top of the housing by a distance approximately equal to the size of the bulbous upper edge of the fairing. The upper clamp 142 includes a left protrusion 145 and a right protrusion 150 separated by a distance 155 greater than the width 156 of the non-edge portions 157 of the fairing while less than the width of the bulbous portion 120 of the fairing. Illustrated in FIG. 18 is a trailer housing having both an upper clamp 140 and a lower clamp 160. While both clamps may be vertically mobile or vertically stationary, in an exemplary embodiment the upper clamp 140 is stationary while the lower clamp 160 is movable up and down. By adjusting the separation of the upper clamp 140 from the lower clamp 160, a trailer operator is able to adjust the amount of vertical tension applied to the flexible fairing. Like the upper clamp 140, the lower clamp 160 includes a left and right protrusion separated by a distance greater than the average width of the fairing while less than the width of the bulbous portion of the lower angled edge 75 of the fairing. The clamps may be manually adjustable by an operator such that they are moved up and down when an operator actuates a mechanical device. Alternatively, the clamps may be biased with spring systems that apply a set level of upward or downward force upon the edges of the fairings. In one example, the lower clamp 140 is connected to the bottom of the roller tensioner via a spring array that acts to pull the lower clamp down towards the bottom of the roller tensioner. In an exemplary embodiment of the invention, the lower clamp 140 is connected to the spring array via a rope and pulley system such that the lower clamp may pulled to close proximity of the bottom of the roller tensioner without a substantial change in downward force by the clamp.

As the vertically adjustable roller clamp is moved downward, the lower edge of the fairing is pulled away from the upper edge which causes the fairing to be vertically tensioned. Over the course of time, it is expected that there will be some stretching of the fabric fairing so the vertically adjustable roller clamp may need to be further lowered to maintain an appropriate level of vertical tension on the fairing.

The upper and lower edges of the fairing meet, or nearly meet, at a reinforced tapered end 84. In the illustrated example, the reinforced end includes a reinforcing material, such as a resilient plastic or metal that extends between the upper and lower edges of the fairing. In the reinforcing material is an eyelet, or a plurality of eyelets through which a cable or rope may be threaded. In another embodiment the reinforcing section includes an integrally formed rope, chain, or cable 130 that acts as a continuation of the upper bulbous edge 120 of the fairing and is of appropriate size such that it is also guided through the C-shaped track 125 as the fairing is retracted into the housing by the vertical roller. The rope or cable extends from the reinforced section to a middle roller 165 (or micro tensioner) located between the trailer landing gear and the wheel bogie. As with the vertical roller, the middle roller 165 acts to horizontally pull upon and tension the fairing. In the illustrated example, the middle roller 165 is configured to pull upon the cable 130 and generally not expected to roll a portion of the fairing so the middle roller 165 may have a height that is substantially less that the primary roller tensioner systems. A spring based system may be utilized by the middle roller 165 to apply tension upon the fairing or a ratcheting system similar to that described with regards to the vertical roller may be utilized.

While single springs are used to tension the rollers in the illustrated example, more complex systems may be utilized to increase or decrease the pull of the spring based on the extension of the fairing from the roller. For example, as shown in FIGS. 25 and 26, the vertical roller may include a primary spring 166 and a secondary spring 167 that are rotated by a device within the roller, and the device may be configured such that only once a certain level of fairing extension has been reached will the device act upon the spring. The device may include a threaded casing 159 with a protrusion 168 that is rotated about the screw and contacts a panel 169 secured to the secondary spring 167 once the protrusion 168 has vertically reached a certain level.

When the fairing is initially unwound from the roller, only the primary spring 166 acts to pull the fairing back to the tensioner. As the fairing is further unwound, the tensioner is rotated which causes the protrusion 168 to rotate around a screw and move downward to the panel 169 associated with the secondary spring 167. The protrusion 168 engaging the panel 169 causes the secondary spring 167 to rotate along with the primary spring 166. With both the primary spring 166 and the secondary spring 167 rotating, the amount of pull by the tensioner is substantially increased which causes a dramatic increase in the amount of horizontal tension applied to the fairing. In one embodiment, the vertical position of the protrusion may be manually moved up or down without unwinding the tensioner. The manual adjustment of the height of the protrusion changes how many times the roller must be rotated before the secondary spring is engaged such that an operator may configure the fairing so that substantial tension is only applied when the fairing is fully or almost fully deployed on the trailer.

While a spring type tensioning system is illustrated in FIGS. 25 and 26, other systems to ensure that the flexible fairings are taught may be utilized. For example, the vertical rollers may be operated by miniature electric motors that rotate the rollers. In another system the rollers are manually operated by a truck driver who turns a radially ratcheting nut to tension or relax the fairings. In one example, the radially ratcheting nut would be located in the center of the underside of the roller directly below a disk that acts to support the flexible fairing when the fairing is not in a deployed configuration. In yet another configuration, a non-rotating housing substantially surrounds each of the vertical rollers and the flexible fairings are pulled out of the non-rotating housings through vertical slits in the housings.

Multiple Rolling Systems

Figure 27:
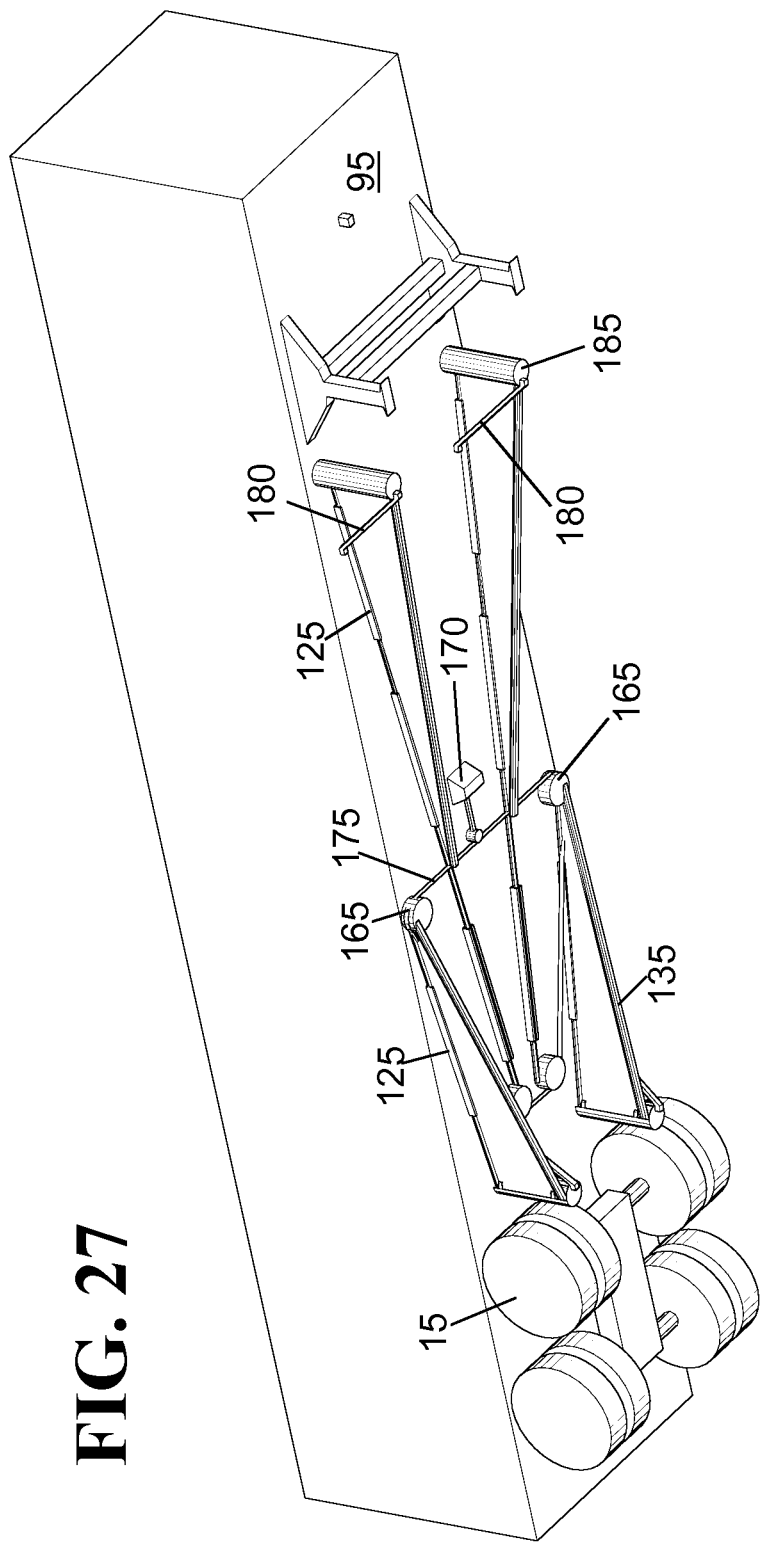
FIG. 27 shows a lower perspective view of a trailer having a remotely controllable fairing deployment system.
Figure 28:
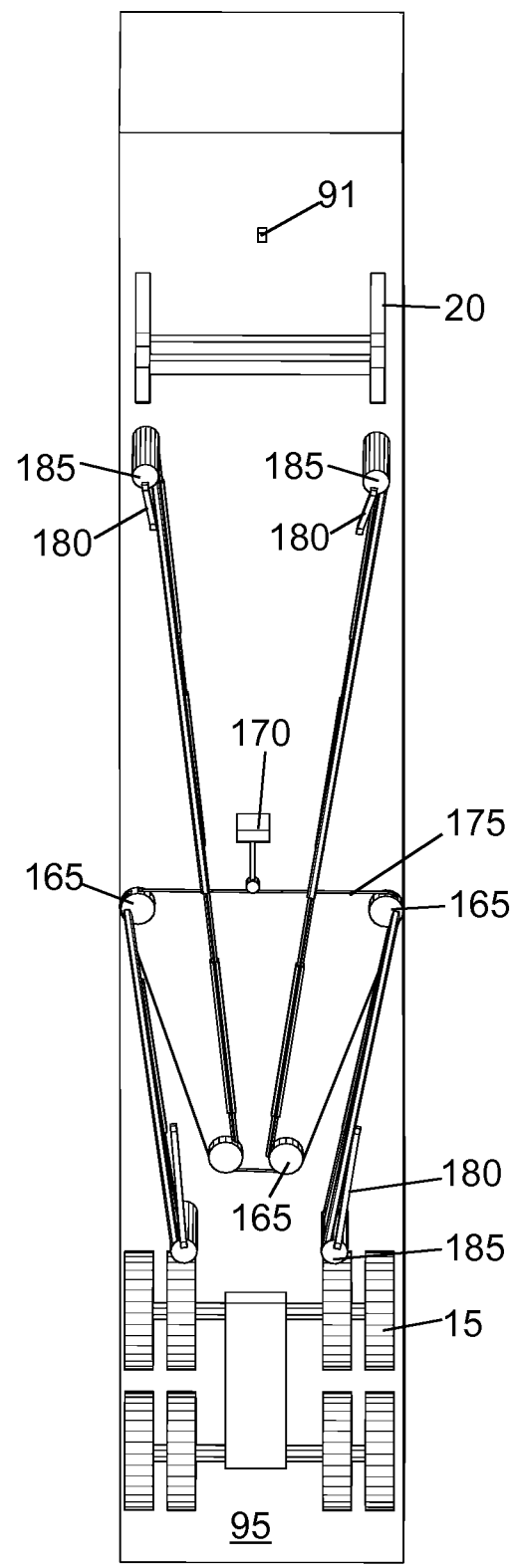
FIG. 28 shows a second lower perspective view of a trailer having a remotely controllable fairing deployment system.
Figure 32:
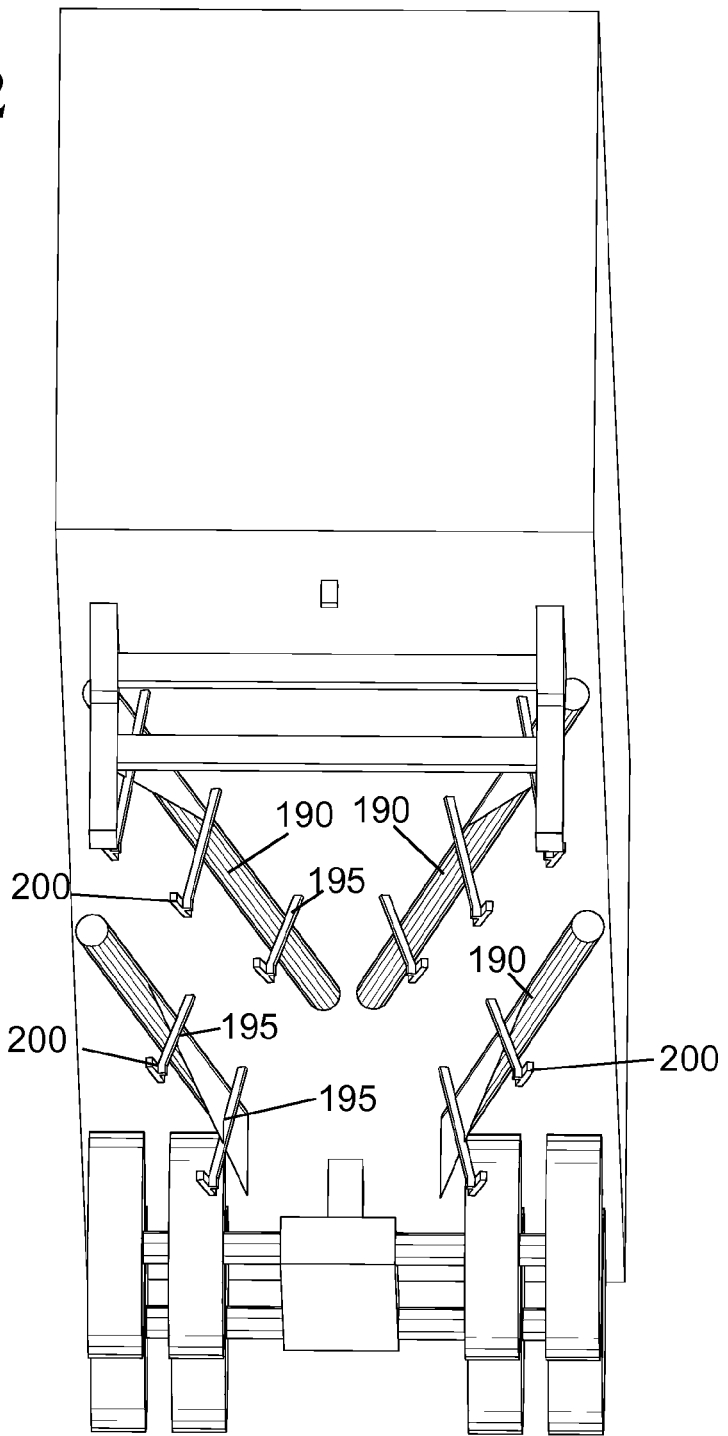
FIG. 32 shows a lower front perspective view of a trailer with four roll down flexible fairings and a plurality of rigid supports.

While the tensioning of each fairing may be individually controlled, in the system illustrated in FIGS. 27 through 28, a single centrally-located motor 170 is utilized to horizontally tension the four fairings. The front two fairings have a spring based vertical rollers 115 located near the rear of the landing gear which act to forwardly pull the two fairings. As the fairings are pulled out from the housings of those vertical rollers, the amount of tension provided by the springs gradually increases based on the spring constant of the springs used in the rollers. Similarly, the rear trailer fairings have two spring based vertical rollers 115 located near the wheel bogie 15. Each of the four fairings includes a rope or cable 130 extending from a reinforced section that extends to a device (such as a middle roller 165) associated with the centrally located motor 170 that acts to pull the rope towards the middle point of the trailer.

In one example, the four micro or middle rollers 165 are all connected to a single electric motor 170 via a bicycle-like drive chain 175. The motor 170 moves the chain which is connected to the micro rollers 165 and causes them to rotate in such a way that the fairings are pulled towards the center of the trailer or are allowed to relax back into housings of the vertical rollers 115. Since the lengths of the forward trailer fairings may not be equal to that of the rear trailer fairings, the micro-rollers 165 may include devices that limit the rotation of the micro-rollers once the ropes or cables 130 exert a certain amount of torque up the rollers. In one example, the mechanics of the micro-rollers 165 would be similar to that of a torque wrench with a clutch mechanism that is designed to slip once a certain level of torque is reached. Once the smaller fairings are fully extended, the micro-rollers associated with those fairings would slip as the rollers associated with the larger fairings continue to pull on the fairing.

In another example, the device includes a linear bar aligned perpendicular to the length of the trailer that extends substantially across the width of the trailer and the bar is rigidly secured to the bottom of the trailer. Extending from the bar are four micro rollers that pull on the ropes of the four fairings. Rotation of the bar causes rotation of the four micro rollers.

In another embodiment, instead of taking a linear shape, the four micro-rollers are arranged in a trapezoidal configuration. As with the previous example, the same clutch slipping features may be incorporated into the micro-rollers and all of the rollers may be actuated by a single bicycle-like chain that is arranged in a trapezoidal arrangement.

In one embodiment, the electric motor would be remotely controllable from the cabin of the tractor while the tractor trailer is in motion. In yet another variation, a crosswind sensor located on the tractor or the trailer would indicate to the driver when conditions are dangerous and the fairings should be retracted to help ensure safe operation of the trailer.

Support for Vertical Rollers

As illustrated in FIGS. 16, 24, 27, 28, 33, 34, 35, 37, 38, and 40 numerous different support systems may be utilized to support the vertical rollers. As the horizontal tension on the vertical rollers is increased, the amount of torque applied to the vertical roller relative to the underside of the trailer is increased. The height of the vertical roller provides a substantially amount of leverage to the torque force which could cause damage to the roller if steps are not taken to reinforce the roller. In one example, there are no external supports to the vertical roller, but the structural integrity of the roller near the underside of the trailer has been increased by using more robust materials or a more resilient internal structure (such as a lattice network within the roller). In other embodiments, an angled external support 180 has one end connected to the bottom 185 of the vertical roller and another end secured to the bottom of the trailer 90. The combination of the vertical roller, the angled external support, and the bottom of the trailer form an open framework trellis that provides a high degree of rigidity with a minimal amount of materials.

In one example, the angled external support is constructed of a rigid metal and extends from the vertical roller in generally the same direction as the fairing. However in another embodiment, the angled external support is a cable stay that extends from the vertical roller on the opposite side as the fairing.

Roll Down Design

In the embodiment shown in FIGS. 29 through 32, the horizontal rollers 190 secured directly below the lower surface 95 of the trailer contain the fairings and act to upwardly pull upon the flexible fairings. At various intervals along the horizontal rollers are located vertical supports 195 which extend downward and include latching features 200 configured to interconnect with the lower edges of the fairings and keep the fairings in an operational configuration. In another embodiment, a slanted bar extends between multiple vertical supports and provides numerous attachment points which may be used with the fairing.

Backs of Rear Trailer Fairing Located on Moveable Tracks

Figure 33:
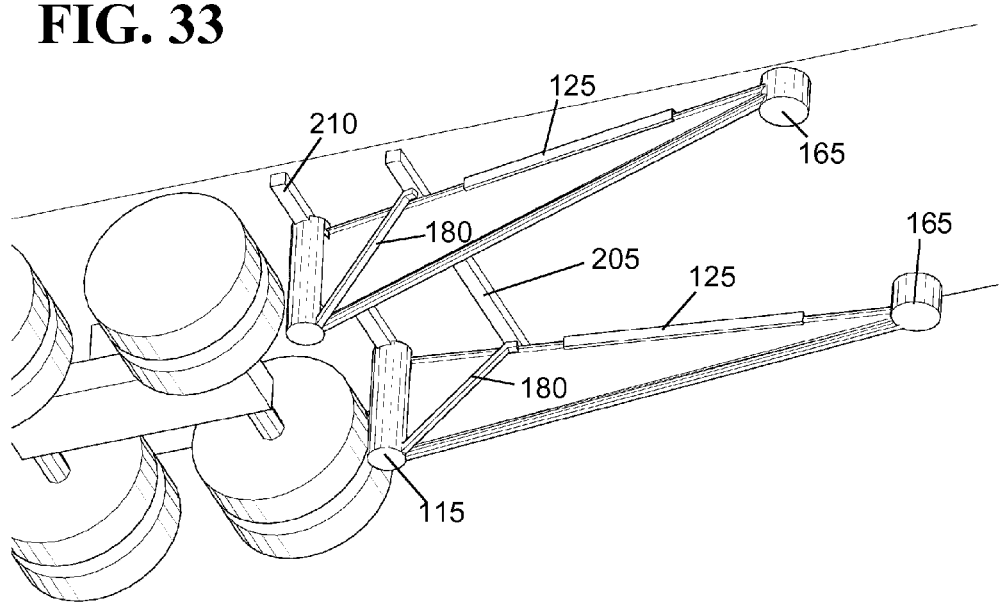
FIG. 33 shows a lower side perspective view of roller tensioners mounted on tracks that allow for adjustment of the spacing between the tensioners.

Illustrated in FIG. 33 (also FIG. 39) are rear trailer fairings that have their rear ends inwardly moveable along a first track 205 and a second track 210. The first track 205 and the second track are parallel to each other. The angled external supports 180 are translationally secured in the first track 205 while the vertical rollers 115 are translationally secured in the second track 210. In the illustrated example, two vertical rollers 115 are secured within a single second track 210 that extends across the entire width of the trailer. In an alternate embodiment, each vertical roller 115 is located in its own track. The tracks (205, 210) may be constructed in any manner that will allow a user to selectively move and secure the rollers, however in one embodiment the tracks (205, 210) are C-shaped tracks and the rollers are secured in a stationary position by clamping the roller to a portion of the track.

The rear rollers may alternatively include fasteners that are secured to the flexible rear fairing. By sliding the rear rollers along the track, a tractor trailer operator is able to select the angle of attack (relative to the air flow parallel to the length of the trailer) of that fairing. Due to forwards and backwards movement of the wheel bogie, the operator may increase or decrease the minimum separation of the two rear fairings to maximize the amount of air being accelerated between the wheels to the lower pressure zone behind the trailer.

Backs of Rear Trailer Secured to Wheel Bogie

Figure 34:
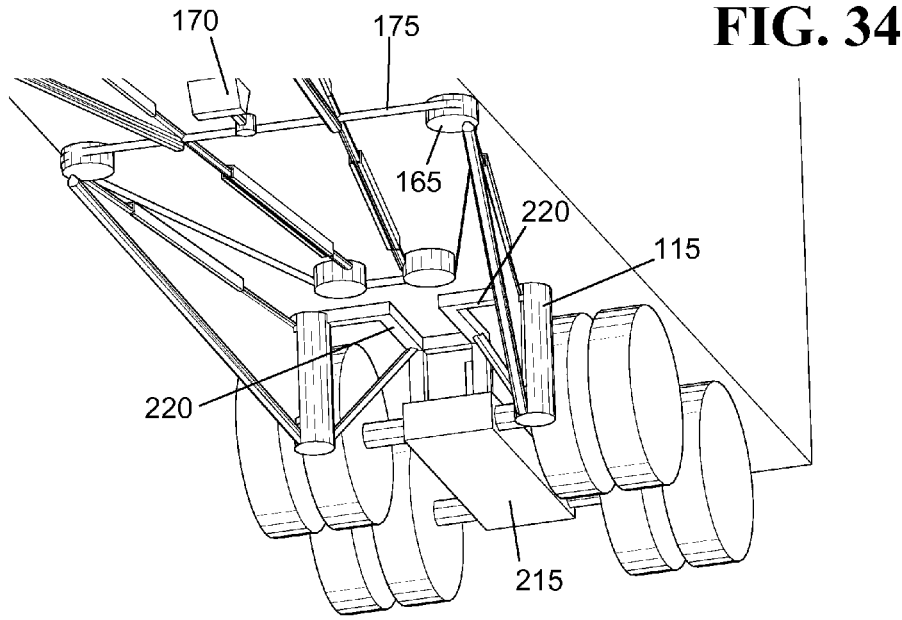
FIG. 34 shows a lower perspective view of two roller tensioners secured to a trailer via a wheel bogie wherein the tensioners move with the wheel bogies.
Figure 35:
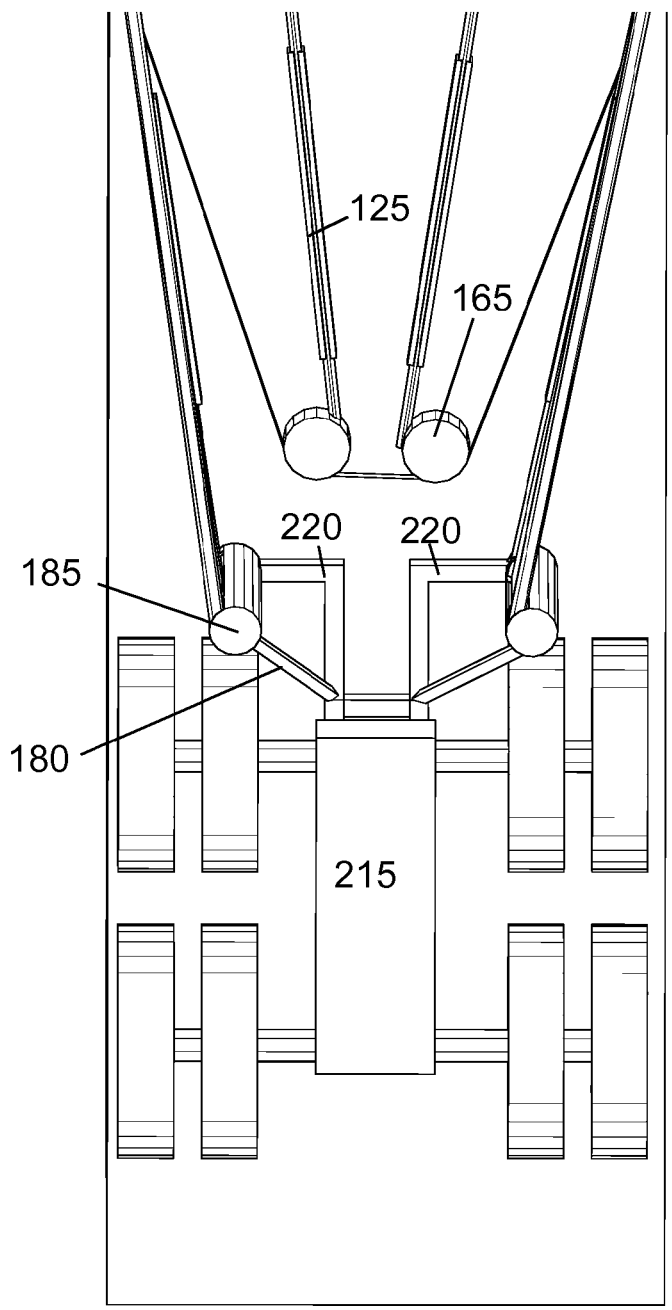
FIG. 35 shows a bottom view of two roller tensioners secured to a trailer via a wheel bogie wherein the tensioners move with the wheel bogies.

Illustrated in FIGS. 34 through 38 are rear trailer fairings that have their rear portions translationally secured to the trailer through the wheel bogie. The wheel bogie includes a center portion 215 between the wheels that is translationally secured to a track (not shown) on the underside of the trailer. Forward supports 220 extend from the center portion 215 and act to support the vertical rollers 115 at the rear of the trailer. In the illustrated example, instead of being secured directly to a bottom surface of the trailer, the rear portions are secured to the wheel bogie such that rear portions move forward and backward with the wheel bogie as the bogie is moved to optimize travel conditions for the trailer (wheel bogie forward to improve turning radius and maneuverability, wheel bogie back to improve weight distribution on the axles). In the illustrated example, the rear portions of the rear fairings are secured near the inner sides of the rear wheels to maximize the amount of air accelerated between the tires. FIG. 34 shows an angled external support 180 extending from the forward supports 220 down to the bottom of the vertical roller 115, however the supports may extend from the center portion 215 directly to the bottoms of the vertical rollers.

In an alternate embodiment, the rear vertical rollers are secured in the same track that is used to translationally secure the wheel bogie to the underside of the trailer. By not having the rollers rigidly secured to the wheel bogie, the operator of the trailer is able to more precisely control the angle of attack for the rear fairings, however since an additional step is needed by the operator to adjust the fairings there may be some operators who simply neglect to adjust the position of the fairings when they move the position of the wheels.

C-Shaped Track for Moveable Rear Fairing

Figure 36:
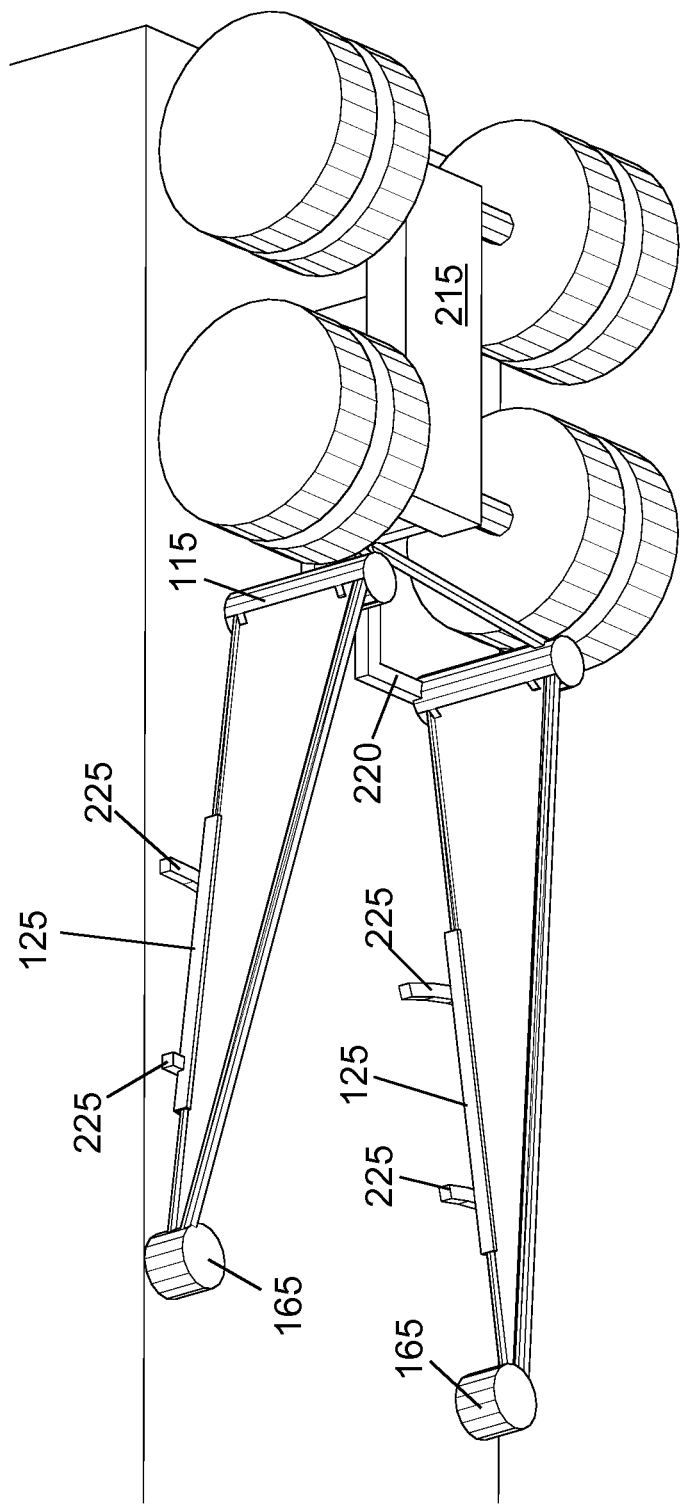
FIG. 36 shows a lower perspective view of roller tensioners secured to a trailer vie a wheel bogie, and C-shaped clamps rotationally secured to the bottom of the trailer via crescent shaped tracks.
Figure 37:
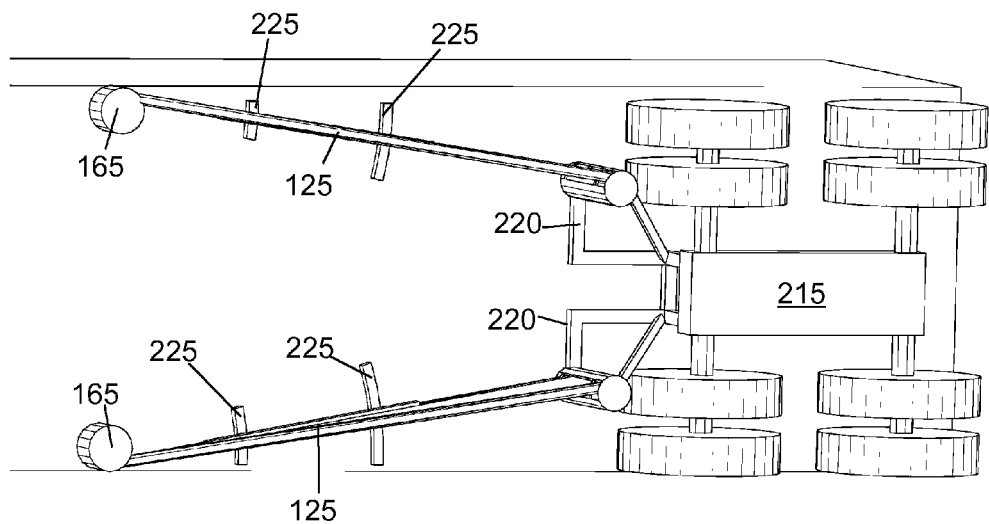
FIG. 37 shows a lower perspective view of roller tensioners secured to a trailer via a wheel bogie, and C-shaped clamps rotationally secured to the bottom of the trailer via crescent shaped tracks, wherein the bogie is at the rear of the trailer.
Figure 38:
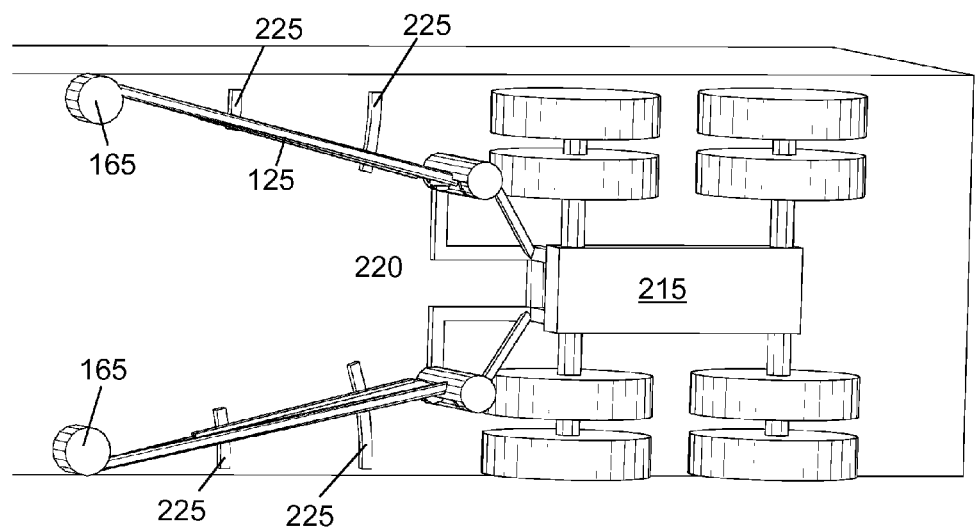
FIG. 38 shows a lower perspective view of roller tensioners secured to a trailer via a wheel bogie, and C-shaped clamps rotationally secured to the bottom of the trailer via crescent shaped tracks, wherein the bogie is spaced apart from the rear of the trailer.

Illustrated in FIGS. 36 through 38 is a movable C-shaped track 125 that moves along concentric curved tracks 225. When the rear fairing is moved back or forward, its angle relative to the side of the trailer is changed. While a C-shaped track rigidly fixed to a specific location on the underside of a trailer is able to accommodate some variation in the angle of the fairing, for larger movements of the fairing it may be advantageous to utilize a track that rotates, moves, or pivots as shown the illustrated example. In the illustrated example, the C-shaped track is secured to the underside of the trailer through two concentric curved tracks 225 that allow the C-shaped track to be aligned with the rear fairing regardless of the movement of the fairing. When the wheel bogey is moved forward, the angle of attack of the movable rear fairing increases. In response, the C-shaped track moves inwardly along the two curved tracks to match the angle of attack of the fairing. As the wheel bogie is moved back and the angle of attack for the rear fairing decreases, the C-shaped track moves outwardly along the two curved tracks to again match the angle of the fairing.

FIGS. 37 and 38 show the C-shaped track in two different positions along the concentric curved tracks. The curved tracks are concentric about the middle roller 165 to allow for a smooth movement of the C-shaped track. By continuously matching the angle of the fairing regardless of the angle of attack, the amount number of wear causing pinch-points for the C-shaped clamp is decreased. Two concentric tracks are shown in FIGS. 36 through 38, however a single curved track or numerous concentric tracks may be utilized. As with the C-shaped tracks and width-wise tracks (205, 210), numerous different mechanisms may be used with the curved tracks on which the C-shaped track is mounted. In one example, the concentric curved tracks 225 are also C-shaped and rollers mounted on the C-shaped track 125 are located within portions of the curved tracks 225. In yet another embodiment, instead of a being mounted on a track, the C-shaped track 125 is mounted on a rod that hinges a point near a middle roller 165.

Spare Tire Fairing

Figure 39:
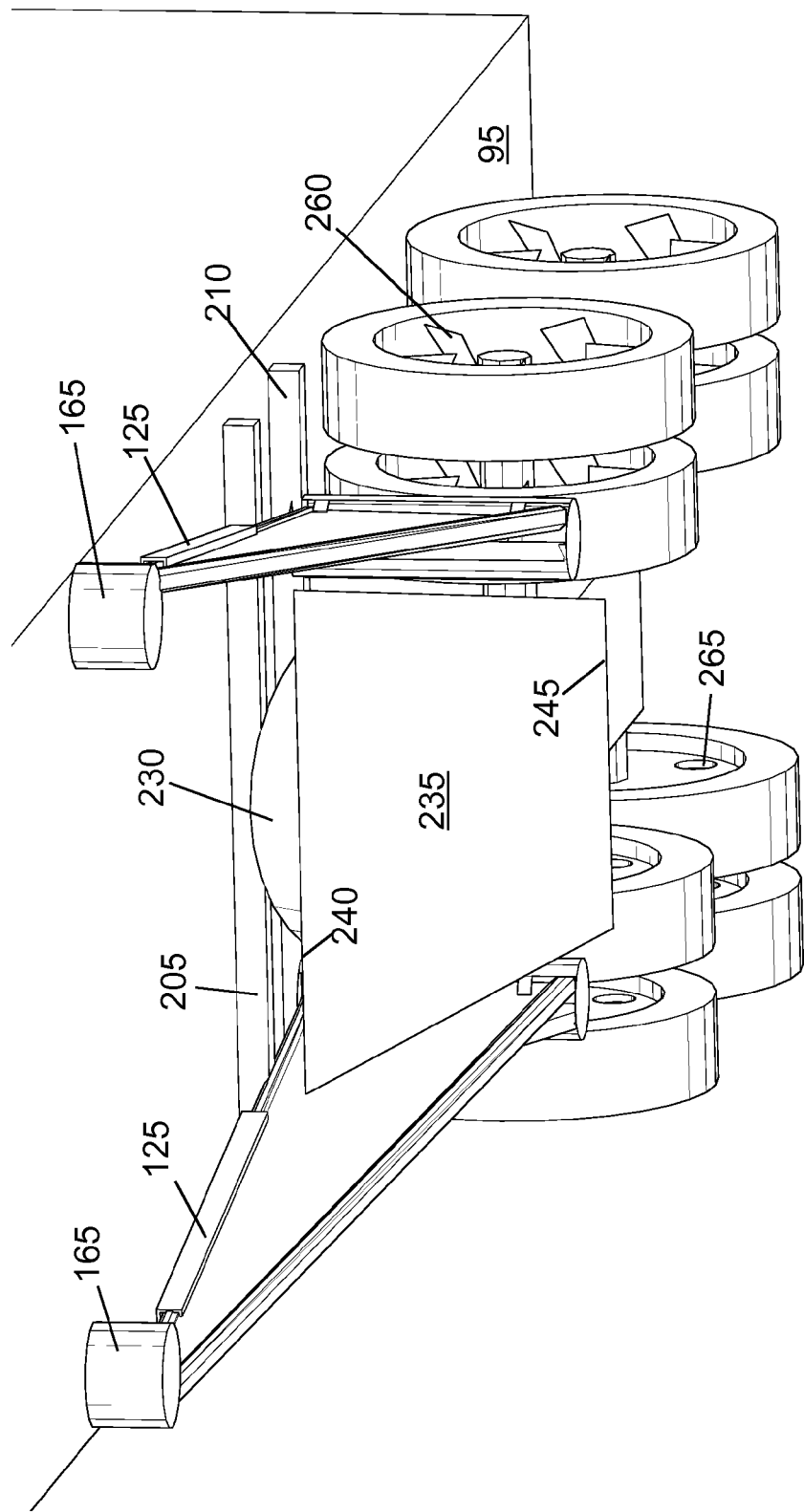
FIG. 39 shows a lower perspective view of a trailer with a spare tire and fairing located between tensioners of rear flexible fairings.
Figure 40:
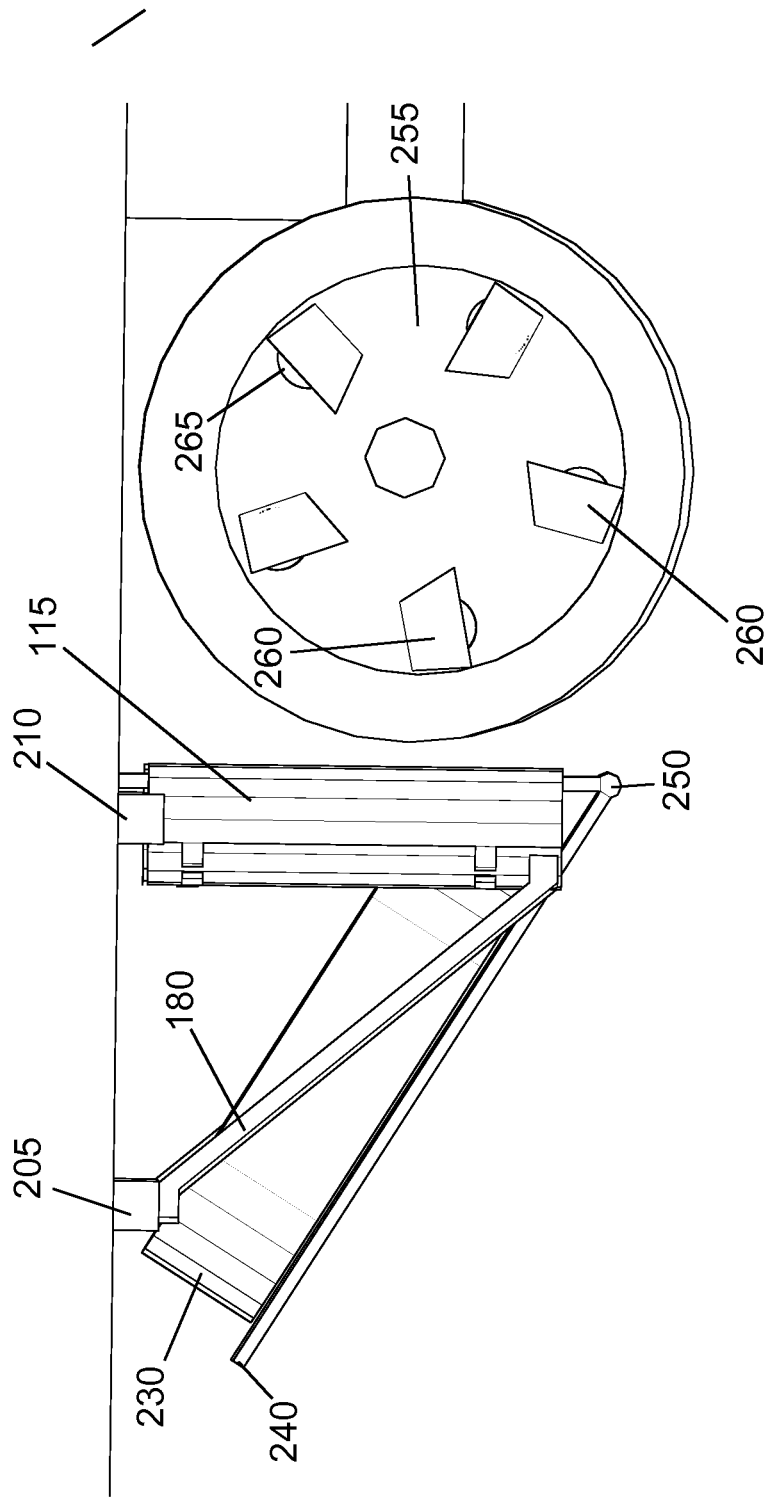
FIG. 40 shows a side view of a trailer with a spare tire and fairing located between tensioners of rear flexible fairings.

Illustrated in FIGS. 39 and 40 is a flexible fairing system where the spare tire 230 under the trailer is positioned to direct airflow in cooperation with the rest of the fairing system. In the illustrated example, the spare tire is located between the rear portions of the rear trailer fairings and acts to further accelerate the airflow through the wheel bogie. Although the wheel may be stored substantially horizontally, in the illustrated example the wheel is positioned at approximately a 45 degree angle off horizontal to better direct the airflow through the wheel bogie. In yet another example, a smooth tire fairing 235 is positioned directly below the angled spare tire to smooth out the airflow going through the wheel bogie. The illustrated tire fairing 235 is generally trapezoidal with the top edge 240 being a bit longer than the bottom edge 245 to follow the contour of the rear fairings. While the front and rear fairings are constructed of flexible materials such as fabric, the tire fairing is generally expected to be a rigid or semi-rigid material that will protect the spare tire from road debris. As shown in FIG. 40, the tire fairing 235 includes a hinge 250 about which the front portion of the fairing may rotate. When the tire is to be accessed, the front portion rotates downward to the ground about the hinge 250. Additionally, after the damaged tire has been replaced, the damaged tire can be secured to the underside of the trailer by rolling the damaged tire onto the tire fairing 235 and using the hinge 250 to lift up the tire. Tires and rims of a trailer can weigh up to 250 pounds, so the use of the hinge substantially decreases the amount of physical effort needed by a driver to stow a tire. There are many other ways that cage for holding the angled spare tire may be designed. In one example, the cage has an opening at the top of sufficient size so that the tire may be pulled out when needed.

Wheel Suction

Figure 41:
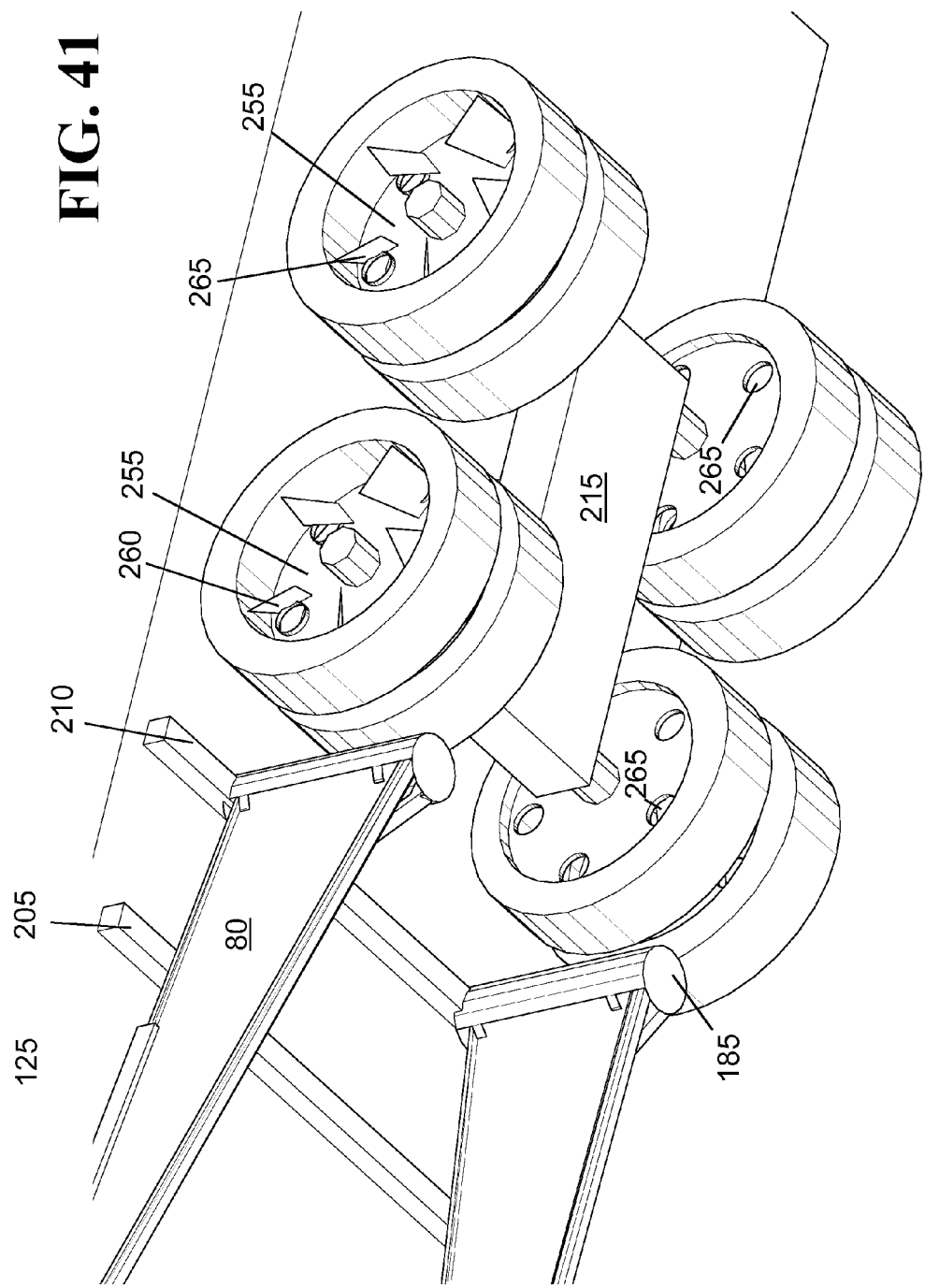
FIG. 41 shows a lower perspective view of a trailer with roller tensioners mounted on the trailer via linear tracks and suction wheels having vents and holes to push air towards the center of the trailer.
Figure 42:
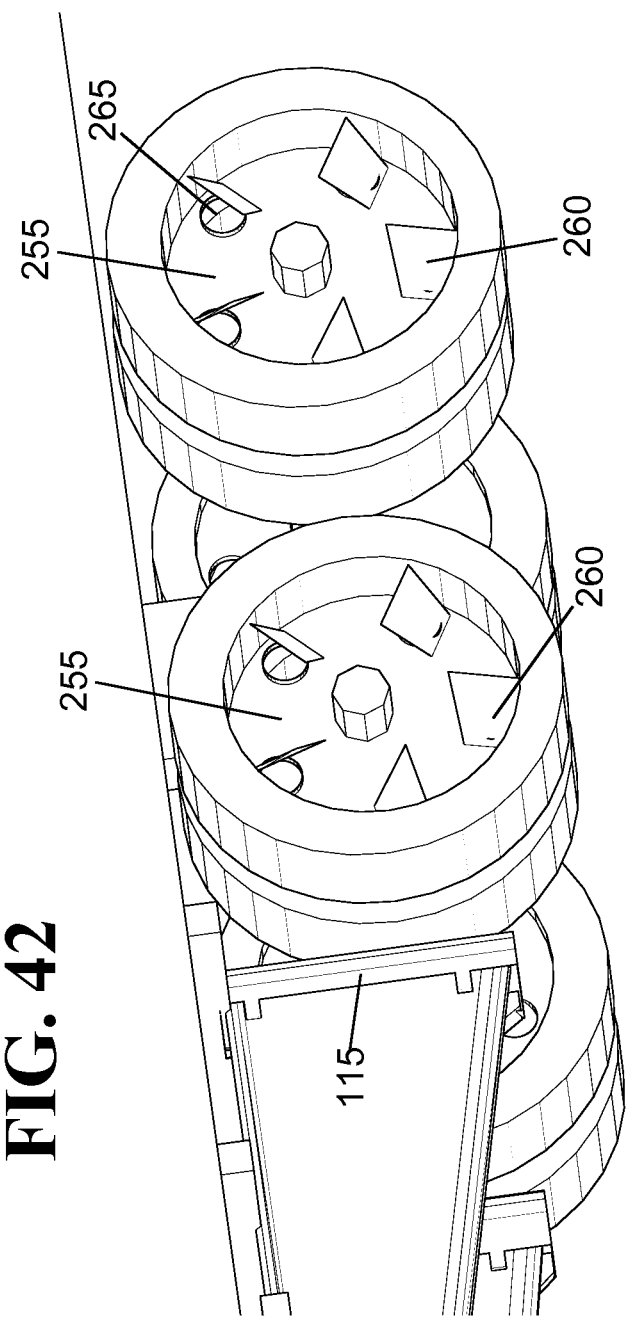
FIG. 42 shows a side perspective view of a trailer with roller tensioners mounted on the trailer via linear tracks and suction wheels having vents and holes to push air towards the center of the trailer.

As seen in FIGS. 40 through 42, the rims 255 of the outer wheels include fan blades 260 scoops that draw air in between the wheels of the bogey 15 when the trailer is moving forward (or push air out if the trailer is moving backwards). Small holes 265 in the wheel rims act as conduits through which the air may pass from the outer side of the trailer to between the wheels of the bogie 15, and eventually to the lower pressure zone behind the back of the trailer.

Alternatively, or in addition to the outer wheel blades, the inner sides of the wheel rims could include fan blades that also act to push air towards the center of the wheel bogie. By increasing the air pressure at the center of the bogie 15, additional air is pushed to the low pressure zone behind the back of the trailer and the amount of parasitic drag caused by the low pressure zone is decreased.

In another example, the wheel bogie 15 includes a plurality of features to increase the amount of accelerated air that reaches the low pressure zone behind the rear of the trailer. A horizontal fairing similar to a tonneau cover may extend between the two wheel axles of the bogie and the inner sides of the wheels may include flat wheel covers to direct the air to the back to the low pressure zone behind the trailer.

Non-Roller Tensioning Systems

Illustrated in FIGS. 43 through 48 are non-roller fairing tensioning systems with features integrally formed into part of the trailer. In the illustrated examples, the front trailer fairing is secured to various attachment features on the landing gear 20. Since the fairing is not being rolled, the fairing may have an irregular shape (as shown) that better matches the shape of the landing gear. The attachment features may be stationary, or the attachment features may be able to translate in a direction that allows an operator to increase or decrease the amount of tension that is applied on the trailer fairing. In the illustrated example, the first set of attachment points on the trailer landing gear are configured to translate upward along a track at approximately a 45 degree angle. By moving these attachment points, a user is able to pull the upper portion of the trailer fairing away from the lower edge of the fairing to increase the amount of vertical tension applied to the fairing. The second set of attachment points are located on the more vertical parts of the trailer landing gear and are configured to be translated horizontally to increase or decrease the amount of horizontal tension on the trailer fairing.

Figure 43:
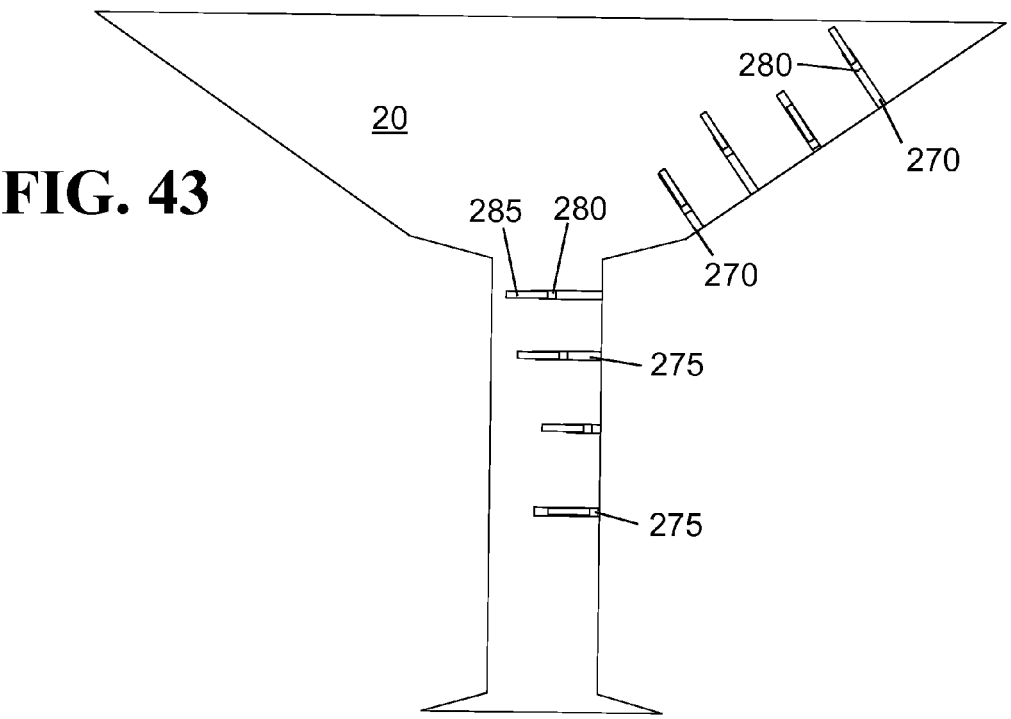
FIG. 43 shows a side view of trailer landing gear having hooks adapted to receive and secure eyelets of a flexible fairing, wherein the hooks are translationally secured within integrally formed slots in the landing gear.
Figure 44:
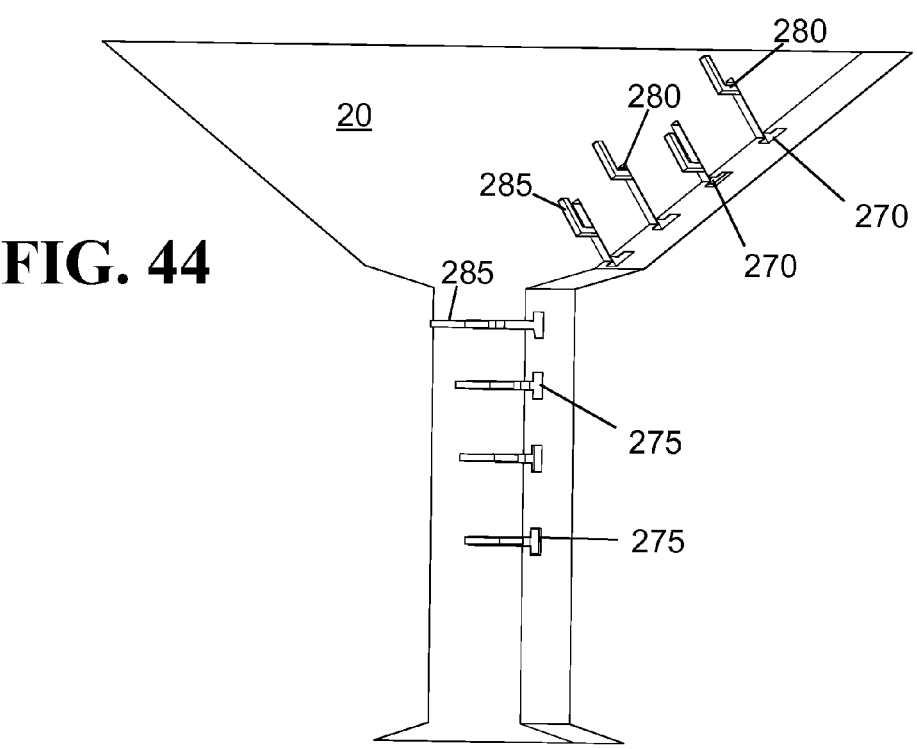
FIG. 44 shows a side perspective view of trailer landing gear having hooks adapted to receive and secure eyelets of a flexible fairing, wherein the hooks are translationally secured within integrally formed slots in the landing gear.
Figure 45:
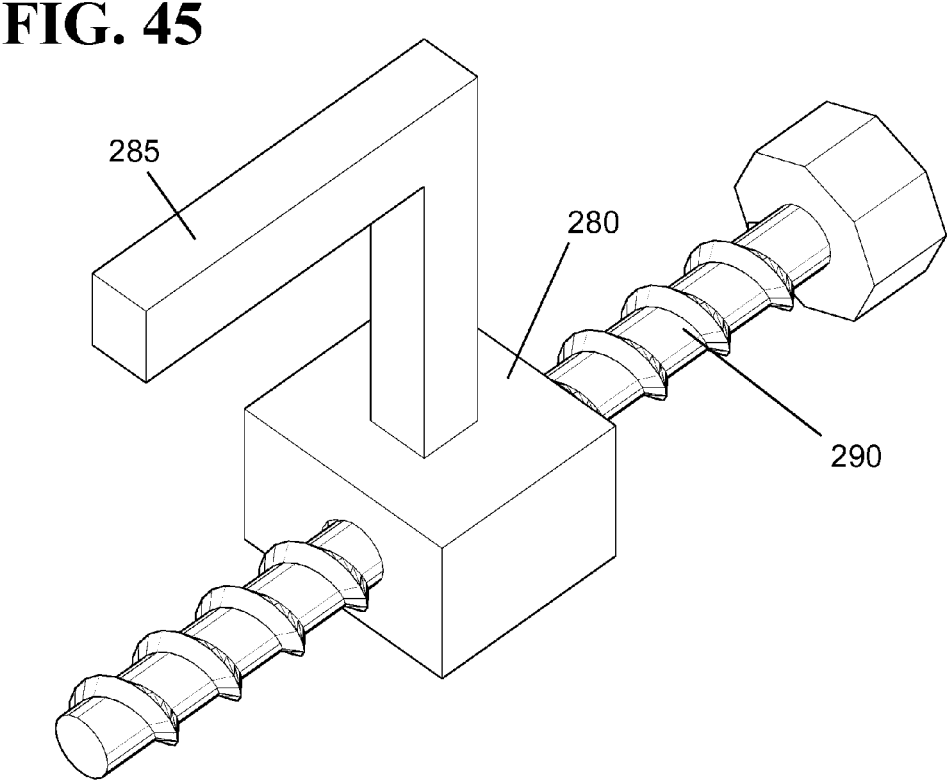
FIG. 45 shows a side perspective view of a hook movable relative to trailer landing gear via a screw based worm drive.
Figure 46:
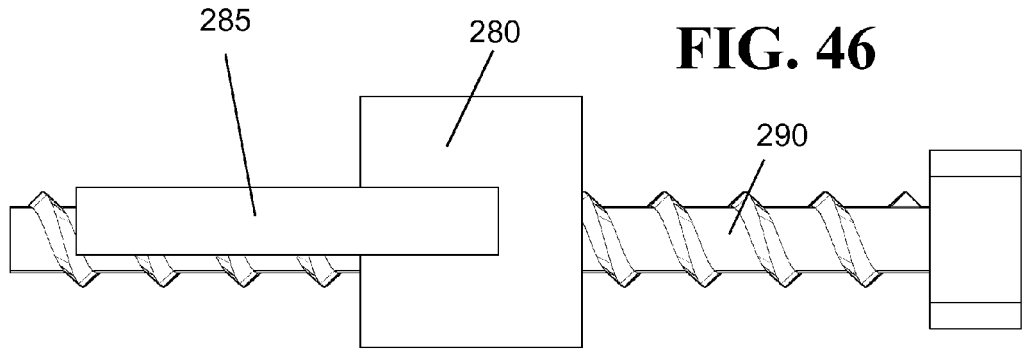
FIG. 46 shows a top view of a hook movable relative to trailer landing gear via a screw based worm drive.

Shown in FIGS. 43 and 44, the landing gear 20 includes a plurality of angled slots 270 and horizontal slots 275 integrally formed into the landing gear 20's rigid frame. The angled slots 270 are found at the upper part of the landing gear and are structured to provide an upward pull on the trailer fairing while the horizontal slots primarily act to tension the fairing in the horizontal direction. In the slots are secured actuators 280 that include hooking features 285 (or fasteners)

configured to catch and pull upon portions of a flexible trailer fairing. The interior of the slots (270, 275) may be similar to that of the C-shaped track.

Figure 47:
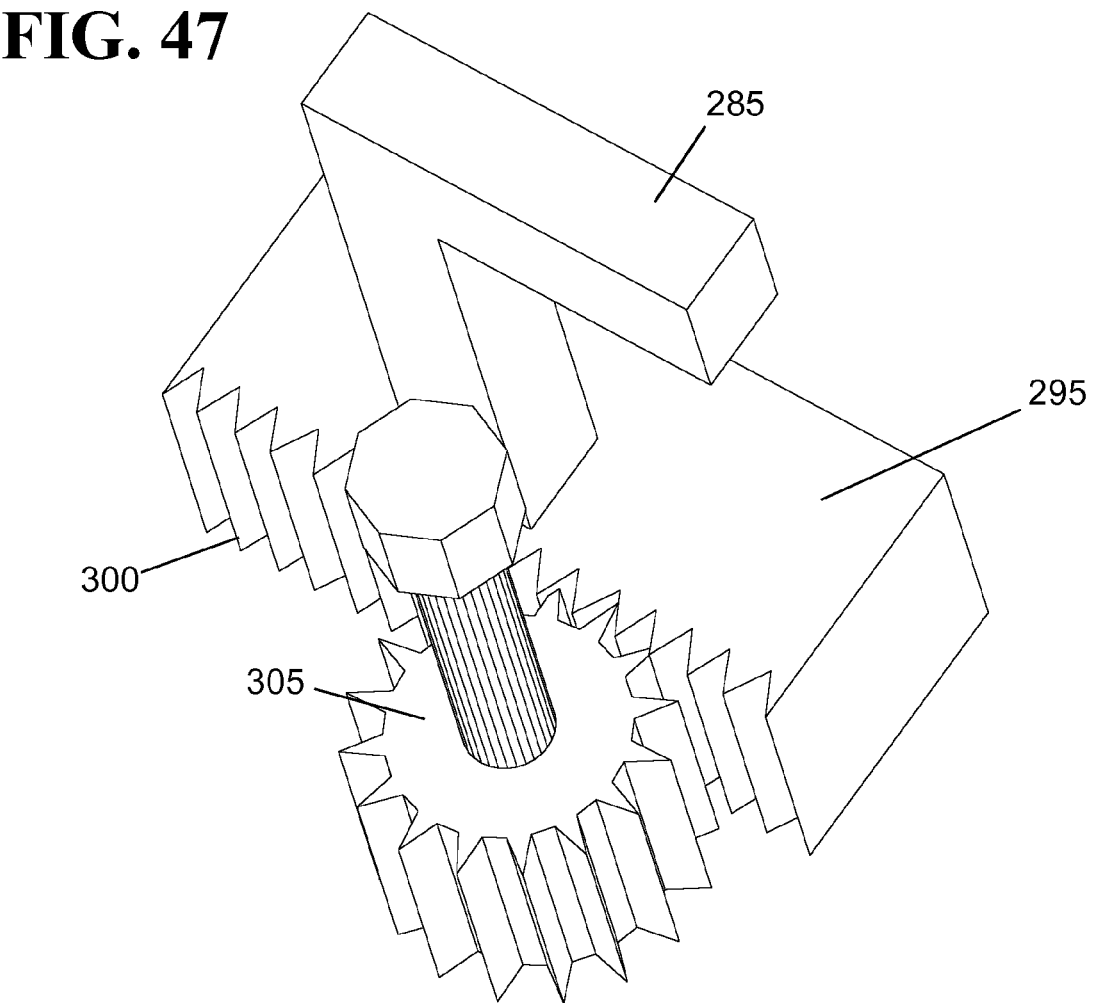
FIG. 47 shows a perspective view of a cog based translation system for moving a hook relative to a trailer landing gear to tension a flexible fairing.
Figure 48:
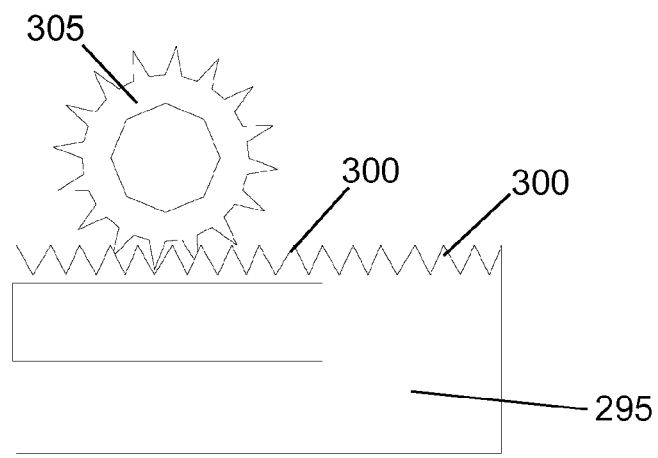
FIG. 48 shows a top view of a cog based translation system for moving a hook relative to trailer landing gear to tension a flexible fairing.

There are numerous actuator systems that can be used to translate the attachment points on the trailer landing gear. In the first example shown in FIGS. 45 and 46, the attachment point is configured to translate along a screw 290 that is rotated by an operator. The movement of the attachment point along the screw is similar to system used in screw/band (worm gear) hose clamps. The interior of the actuator is structured with an opening shaped complimentary to the shape of the screw. Another system for translating the attachment points is shown in FIGS. 47 and 48 where the actuator is rigidly secured to a linear bar 295 with a plurality of teeth 300. An operator of the tractor trailer is able to operate a ratcheting cog 305 that pulls the linear bar 295 along a predetermined path. An advantage of using the linear bar with teeth is that unlike the worm drive system, the cog may extend outwardly and generally perpendicular to the fairing which may allow for easier actuation of the assembly. In one example, a standard sized nut would extend outwardly from the cog which would allow for easy access by an operator with an appropriately sized wrench. Another option that may be utilized is an internal ratcheting system that acts to prevent the cog from rotating in a certain direction when the ratcheting system is engaged.

Figure 49:
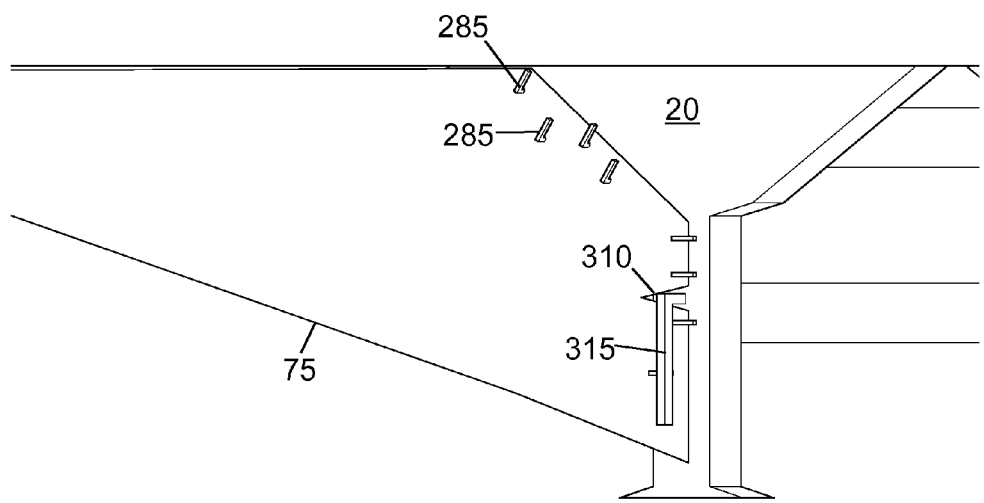
FIG. 49 shows a side perspective view of a flexible fairing secured to trailer landing gear, wherein the flexible fairing includes a cutout portion adjacent to the crank for vertically adjusting the height of the landing gear legs.
Figure 50:
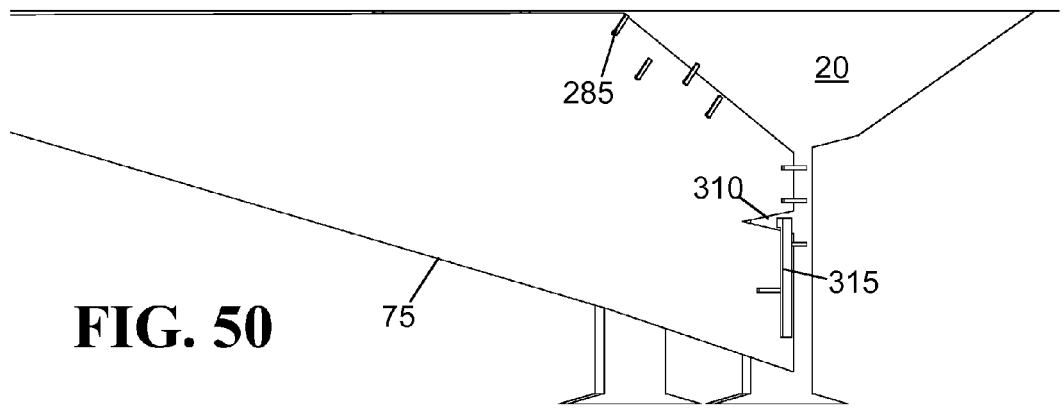
FIG. 50 shows a side view of a flexible fairing secured to trailer landing gear, wherein the flexible fairing includes a cutout portion adjacent to the crank for vertically adjusting the height of the landing gear legs.
Figure 51:
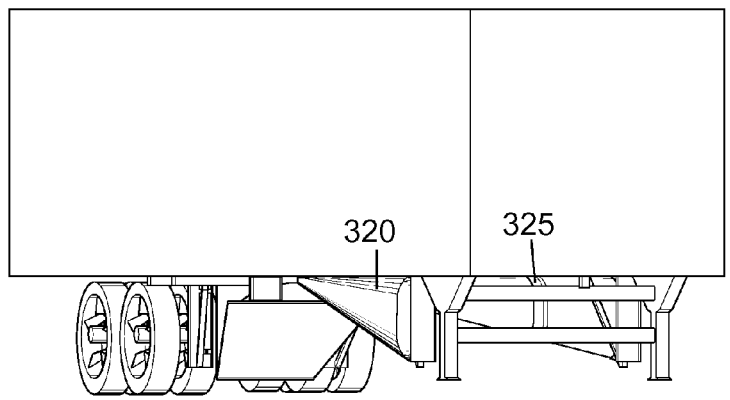
FIG. 51 shows a perspective view of a trailer with flexible fairings having batons that impart a predetermined aerodynamic shape to the fairing.
Figure 52:
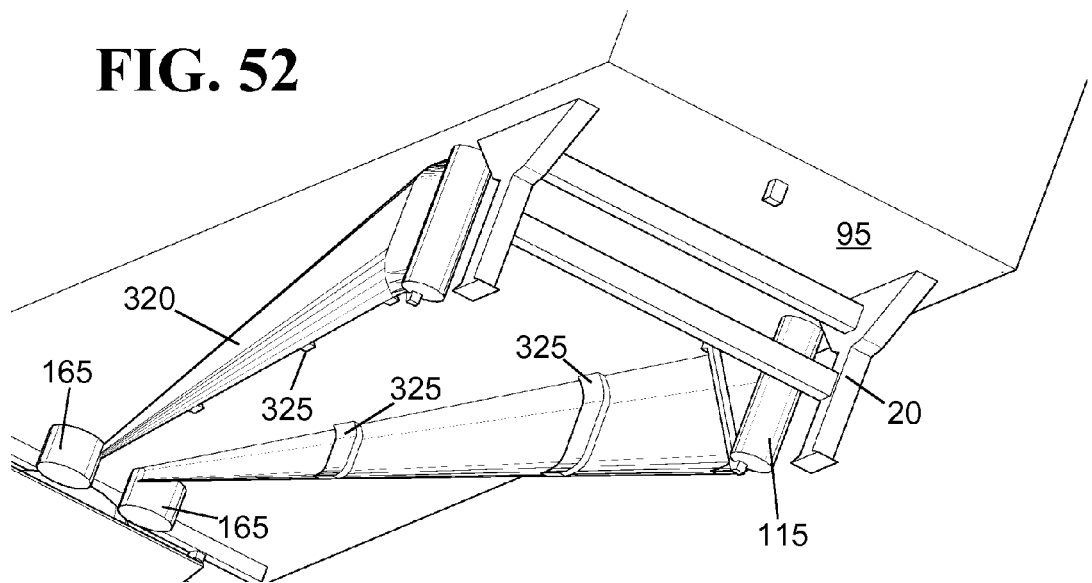
FIG. 52 shows a close up perspective view of a trailer with flexible fairings having batons that impart a predetermined aerodynamic shape to the fairing.

As shown in FIGS. 49 and 50, the shape of the fairing may be specifically configured to compliment a specific landing gear. In the illustrated example, not only does the fairing match the general outline of the landing gear, the fairing also includes a slight cutout 310 section adjacent to the handle 315 used to vertically actuate the legs of the landing gear. By including a cutout on the fairing, the fairing may be pulled more forward than would otherwise be possible if the fairing simply matched the outline of the landing gear. As shown in FIGS. 51 and 52, the overall shape of the fairing may be modified based on the desired aerodynamics. In the illustrated example, flexible concave fairing 320 is shown that include semi-rigid concave batons 325 that assist the fairing in maintaining the concave shape. The semi-rigid batons may be flexible enough that they can be stored within the vertical rollers 115 when the fairings are not in use. Alternatively, the concave batons may be fully rigid and secured directly secured to the underside of the trailer such that when the fairings are deployed the concave batons act as a skeleton over which the flexible fairing is stretched. In the illustrated example, the batons are shown as having a concave shape, however it should be appreciated that other shapes may be utilized. For example, in one embodiment a concave/convex outer shape is imparted to the fairing so that its vertical profile is in the shape of an S-curve.

The inventor contemplates several alterations and improvements to the disclosed invention. Other alterations, variations, and combinations are possible that fall within the scope of the present invention. Although various embodiments of the present invention have been described, those skilled in the art will recognize more modifications that may be made that would nonetheless fall within the scope of the present invention. Therefore, the present invention should not be limited to the specific examples described.

I claim:

1. An over-the-road trailer comprising:
   a frame adapted for carrying cargo, the frame having a lengthwise center axis bisecting the frame;
   a wheel assembly and a landing gear assembly with a gear width, each connecting to the frame;
   a fairing system connected to and located below the frame, the fairing system including:
   a first and second forward flexible fairing, each of the forward flexible fairings having
      a fairing surface with
         a forward end located near the landing gear assembly,
         a horizontal top edge extending, adjacent to the frame, from the forward end towards a rear end near the wheel assembly,
         a bottom edge extending below the horizontal top edge from the forward end to the rear end,
      the front ends of the first and second forward flexible fairings separated by a distance substantially equal to the gear width; and
   a tensioner near the wheel assembly, the tensioner
   secured to the first forward flexible fairing and
   pulling the rear end of the first forward flexible fairing towards the wheel assembly.

2. The over-the-road trailer of claim 1 wherein the first forward flexible fairing is symmetrical to the second forward flexible fairing about the lengthwise center axis.

3. The over-the-road trailer of claim 2 wherein the bottom edge of the first forward flexible fairing extends away from the lengthwise center axis at a first angle towards a side of the frame.

4. The over-the-road trailer of claim 1 further comprising a plurality of C-shaped clamps secured below the frame, and
   the fairing surface of each of the fairings including an edge secured in one of the plurality of C-shaped clamps.

5. The over-the-road trailer of claim 4 wherein the edge secured in one of the plurality of C-shaped clamps is a bulbous edge.

6. The over-the-road trailer of claim 1 wherein
   the tensioner includes a roller rolling the first forward flexible fairing.

7. The over-the-road trailer of claim 6 wherein
   the tensioner includes a ratcheting structure directly below the roller.

8. An over-the-road trailer comprising:
   a frame adapted for carrying cargo, the frame a lengthwise center axis bisecting the frame;
   a wheel assembly and a landing gear assembly with a gear width, each connecting to the frame;
   a fairing system connected to and located below the frame, the fairing system including:
   a first and second forward flexible fairing, each of the forward flexible fairings having
      a fairing surface with
         a forward end located near the landing gear assembly,
         a horizontal top edge extending, adjacent to the frame, from the forward end towards a rear end near the wheel assembly,
         a bottom edge extending below the horizontal top edge from the forward end to the rear end,
      the front ends of the first and second forward flexible fairings separated by a distance substantially equal to the gear width; and
   a first roller tensioner secured below the frame near the landing gear assembly, and
   a portion of the fairing surface of the first forward flexible fairing rolled around the
   first roller tensioner.

9. The over-the-road trailer of claim 8 wherein
   the forward end of the first forward flexible fairing is secured directly to the landing gear assembly.

10. The over-the-road trailer of claim 8 wherein
the landing gear assembly includes
- a rigid frame for supporting the trailer, and
- a fastener moveable relative to the rigid frame; and the forward end of the first forward flexible fairing is secured to the landing gear via the fastener.

11. The over-the-road trailer of claim 8 comprising
the first roller tensioner including a top portion adjacent to the frame;
the first roller tensioner including a bottom distant from the frame; and
a tensioner support adapted to reduce movement of the bottom relative to the top portion of the first roller tensioner, the tensioner support
- secured to the bottom, and
- extending away from the bottom to a first location distant from the top portion of the first roller tensioner.

12. The over-the-road trailer of claim 11 further comprising
a flexible batten secured to the fairing surface of the first forward flexible fairing.

13. The over-the-road trailer of claim 8 further comprising
a second roller tensioner secured to the frame near the landing gear assembly, and
a portion of the fairing surface of the second forward flexible fairing rolled around the second roller tensioner
wherein
- the first roller tensioner rolls the first forward flexible fairing clockwise and
- the second roller tensioner rolls the second forward flexible fairing counter-clockwise.

14. The over-the-road trailer of claim 13 further comprising
a ratcheting structure directly below a center of the first roller tensioner.

15. The over-the-road trailer of claim 14 wherein
a non-rotating housing surrounds a portion of the first roller tensioner.

16. The over-the-road trailer of claim 8 wherein
the first forward flexible fairing is symmetrical to the second forward flexible fairing about the lengthwise center axis.

17. The over-the-road trailer of claim 16 wherein the bottom edge of the first forward flexible fairing extends away from the lengthwise center axis at a first angle towards a side of the frame.

18. An over-the-road trailer comprising:
a frame adapted for carrying cargo, the frame a lengthwise center axis bisecting the frame;
a wheel assembly and a landing gear assembly with a gear width, each connecting to the frame;
a fairing system connected to and located below the frame, the fairing system including:
a first and second forward flexible fairing, each of the forward flexible fairings having
a fairing surface with
- a forward end located near the landing gear assembly,
- a horizontal top edge extending, adjacent to the frame, from the forward end towards a rear end near the wheel assembly,
- a bottom edge extending below the horizontal top edge from the forward end to the rear end, the front ends of the first and second forward flexible fairings separated by a distance substantially equal to the gear width; and
a track rigidly secured to the frame,
the first forward flexible fairing having a first bulbous edge
- extending adjacent to fairing surface of the first forward flexible fairing, and
- located within the track.

19. The over-the-road trailer of claim 18 wherein
the bottom edge of the first forward flexible fairing is a second bulbous edge.

20. The over-the-road trailer of claim 18 wherein
the first forward flexible fairing is symmetrical to the second forward flexible fairing about the lengthwise center axis; and
the bottom edge of the first forward flexible fairing extends away from the lengthwise center axis at a first angle towards a side of the frame.

* * * * *